United States Patent
Demopoulos et al.

(10) Patent No.: US 9,825,292 B2
(45) Date of Patent: Nov. 21, 2017

(54) LAYERED AND SPINEL LITHIUM TITANATES AND PROCESSES FOR PREPARING THE SAME

(71) Applicants: HYDRO-QUEBEC, Montreal (CA); MCGILL UNIVERSITY, Montreal (CA)

(72) Inventors: George Demopoulos, Outremont (CA); Hsien-Chieh Chiu, Montreal (CA); Karim Zaghib, Longueuil (CA); Abdelbast Guerfi, Brossard (CA)

(73) Assignees: HYDRO-QUEBEC, Montreal, Quebec (CA); MCGILL UNIVERSITY, Montreal, Quebec (CA)

( * ) Notice: Subject to any disclaimer, the term of this patent is extended or adjusted under 35 U.S.C. 154(b) by 121 days.

(21) Appl. No.: 14/434,834

(22) PCT Filed: Oct. 10, 2013

(86) PCT No.: PCT/CA2013/050770
§ 371 (c)(1),
(2) Date: Apr. 10, 2015

(87) PCT Pub. No.: WO2014/056111
PCT Pub. Date: Apr. 17, 2014

(65) Prior Publication Data
US 2015/0236345 A1 Aug. 20, 2015

Related U.S. Application Data

(60) Provisional application No. 61/712,065, filed on Oct. 10, 2012.

(51) Int. Cl.
*H01M 4/485* (2010.01)
*H01M 10/0525* (2010.01)
(Continued)

(52) U.S. Cl.
CPC .......... *H01M 4/485* (2013.01); *C01G 23/005* (2013.01); *H01M 10/0525* (2013.01);
(Continued)

(58) Field of Classification Search
None
See application file for complete search history.

(56) References Cited

U.S. PATENT DOCUMENTS 6,139,815 A 10/2000 Atsumi et al.
6,221,531 B1 4/2001 Vaughey et al.
(Continued)

FOREIGN PATENT DOCUMENTS

JP 09-309727 A 12/1997
WO WO2010/052362 A1 5/2010

OTHER PUBLICATIONS

Chen, J. et al. "Synthesis of sawtooth-like Li4Ti5O12 nanosheets as anode materials for Li-ion batteries" Electrochimica Acta, vol. 55, Issue 22, pp. 6596-6600, 2010.
(Continued)

*Primary Examiner* — Milton I Cano
*Assistant Examiner* — Wyatt McConnell
(74) *Attorney, Agent, or Firm* — Buchanan Ingersoll & Rooney P.C.

(57) ABSTRACT

A process for producing lithium titanate which includes the steps of synthesizing a lithium titanate hydrate intermediate via aqueous chemical processing, and thermally treating the lithium titanate hydrate intermediate to produce the lithium titanate. The lithium titanate hydrate is preferably $(Li_{1.81}H_{0.19})Ti_2O\ll2H_2O$. The lithium titanate is preferably $Li_4Ti_5O_{12}$ (LTO). Synthesizing the lithium titanate hydrate intermediate may include mixing a titanium-containing compound with a lithium-containing compound in a solvent to produce a lithium-titanium precursor mixture. Preferably
(Continued)

Pseudo-binary phase diagram of Li₂O–TiO₂ system the titanium-containing compound includes titanium tetrachloride $TiCl_4$. Also, a lithium titanate obtained according to the process and a lithium battery including the lithium titanate.

48 Claims, 24 Drawing Sheets

(51) Int. Cl.
  *C01G 23/00* (2006.01)
  *H01M 4/02* (2006.01)
(52) U.S. Cl.
  CPC ...... *C01P 2004/24* (2013.01); *C01P 2004/64* (2013.01); *C01P 2006/40* (2013.01); *H01M 2004/027* (2013.01); *H01M 2220/10* (2013.01); *H01M 2220/20* (2013.01); *H01M 2220/30* (2013.01)

(56) References Cited

U.S. PATENT DOCUMENTS

| | | |
|---|---|---|
| 2008/0285211 A1 | 11/2008 | Zaghib et al. |
| 2011/0067230 A1 | 3/2011 | Tan et al. |
| 2011/0135564 A1 | 6/2011 | Kim et al. |
| 2011/0189545 A1 | 8/2011 | Holzapfel et al. |
| 2011/0195177 A1 | 8/2011 | Wang et al. |
| 2011/0278495 A1 | 11/2011 | Lamminmaki et al. |
| 2012/0021292 A1 | 1/2012 | Awano et al. |
| 2012/0141360 A1 | 6/2012 | Park et al. |

OTHER PUBLICATIONS

Chiu, H. et al. ECS Trans., "A Novel Green Approach to Synthesis of Nanostructured Li4Ti5O12 Anode Material", vol. 50, Issue 26, pp. 119-126, 2013.

Chiu, H. et al. "Aqueous Synthesized Nanostructured Li4Ti5O12 for High-Performance Lithium Ion Battery Anodes", J. Electrochem. Soc., vol. 160, Issue 5, pp. A3041-A3047, 2013.

Hao, Y. et al. "Synthesis by TEA sol-gel method and electrochemical properties of Li4Ti5O12 anode material for lithium-ion battery." Solid State Ionics, vol. 176, Issues 13-14, pp. 1201-1206 Apr. 29, 2005.

Khomane, R. B. et al. "CTAB-assisted sol-gel synthesis of Li4Ti5O12 and its performance as anode material for Li-ion batteries." Materials Research Bulletin, vol. 46, Issue 7, pp. 1139-1142, Jul. 2011.

Li, N. et al. "Hydrothermal synthesis of layered Li1.81H0.19Ti2O5•xH2O nanosheets and their transformation to single-crystalline Li4Ti5O12 nanosheets as the anodematerials for Li-ion batteries", Cryst. Eng. Comm., vol. 14, Issue 20, pp. 6435-6440, 2012.

Liu, J. et al. "Microwave-assisted hydrothermal synthesis of nanostructured spinel Li4Ti5O12, as anode materials for lithium ion batteries", Electrochim. Acta, vol. 63, pp. 100-104, Feb. 29, 2012.

Matsui, E. et al. "Solid-State Synthesis of 70 nm Li4Ti5O12 Particles by Mechanically Activating Intermediates with Amino Acids." Journal of the American Ceramic Society vol. 91, Issue 5, pp. 1522-1527, May 2008.

Nugroho, A. et al. "Facile synthesis of nanosized Li4Ti5O12 in supercritical water." Electrochemistry Communications vol. 13, Issue 6, pp. 650-653, Jun. 2011.

Sugita, M. et al. "Synthetic inorganic ion-exchange materials. LVIII, Hydrothermal synthesis of a new layered lithium titanate and its alkali ion exchange." Bulletin of the Chemical Society of Japan, vol. 63, Issue 7, pp. 1978-1984, 1990.

Tang, Y., et al. "Li4Ti5O12 hollow microspheres assembled by nanosheets as an anode material for high-rate lithium ion batteries." Electrochimica Acta, vol. 54, Issue 26, pp. 6244-6249, Nov. 2009.

Extended European Search Report dated Mar. 3, 2016, issued by the European Patent Office in corresponding European Application No. EP 13845924.3-1354/2906503 (8 pages).

Laumann et al. "Rapid Green Continuous Flow Supercritical Synthesis of High Performance Li4Ti5O12 Nanocrystals for Li Ion Battery Applications" Journal of The Electrochemical Society, vol. 152, No. 2, pp. A166-A171, 2012, XP055256404.

International Search Report (PCT/ISA/210) dated Dec. 10, 2013, by the Canadian Intellectual Property Office as the International Searching Authority for International Application No. PCT/CA2013/050770.

Written Opinion (PCT/ISA/237) dated Dec. 10, 2013, by the Canadian Intellectual Property Office Patent Office as the International Searching Authority for International Application No. PCT/CA2013/050770.

Yongchun Zhu "Hydrothermal synthesis of layered $Li_{1.81}H_{0.19}Ti_2O_5$•xH2O nanosheets and their transformation to single-crystalline $Li_4Ti_5O_{12}$ nanosheets as the anode materials for Li-ion batteries" *CrystEngComm*, Jul. 12, 2012, 14, 6435-6440.

Comparison of Lithium Titanate Production Processes

| | Solid-state | Hydrothermal | Sol-gel | One embodiment of Invention |
|---|---|---|---|---|
| precursor | TiO$_2$ + Li$_2$CO$_3$ | TiO$_2$ + LiOH | TTIP + LiAc | TiCl$_4$ + LiOH |
| | High energy Ball-milling | 150-250°C in autoclave | Chelating agent & organic solvent, ~200°C | RT-80°C |
| intermediate | Li$_2$TiO$_3$ | Li$_2$TiO$_3$ | Li$_2$TiO$_3$/LTH | LTH |
| | >700°C | 700°C | 700-500°C | <700°C |
| product | 700nm-30um | 50-700nm, nanostructure | 10-200nm, nanostructure | 5-50 nm, nanostructure |

Figure 3

Comparison of Lithium Titanate Production Processes

| Synthetic Process | | Conventional Solid-State Process | Traditional Wet Chemical Process | | Advanced Aqueous Chemical Process (one embodiment of present invention) |
|---|---|---|---|---|---|
| | | | Sol-gel | Hydrothermal | |
| Raw material | Ti source | $TiO_2$ | titanium (IV) isopropoxide | | $TiCl_4$ |
| | Li source | $Li_2CO_3$ | lithium acetate | LiOH | LiOH |
| | Solvent | -- | Water, organic solvent or mixture of both | | water |
| | Preparing temperature | RT-200 °C | RT-250 °C | 140-250 °C | 0-100 °C |
| Component / equipment | Key factor | High-energy ball-milling | Organic chelating agent | High-pressure autoclave | -- |
| annealing | Temperature | | >700°C | | 350-700 °C |
| | Time | 4-24 h | 6-24 h | | 1.5-8 h |
| Intermediate phase | | | $Li_2TiO_3$ | | $(Li_{1.81}H_{0.91})Ti_2O_5 \cdot 2H_2O$ |
| Particle size | | 70 nm-30 um | 50-700 nm | 10-200 nm | 5-50 nm |
| Nanostructure | | X | O | O | O |

Figure 4

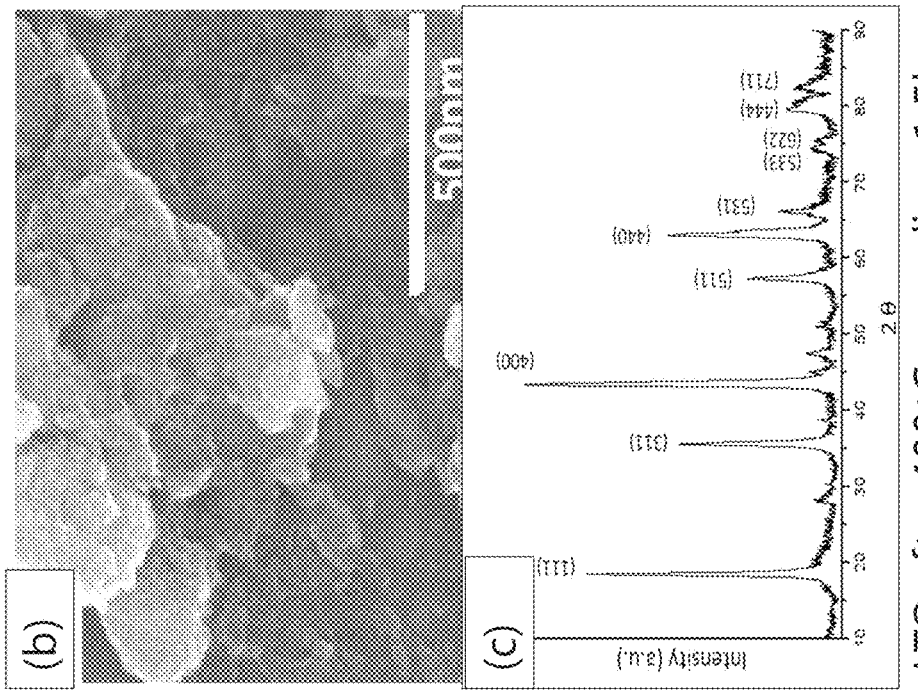
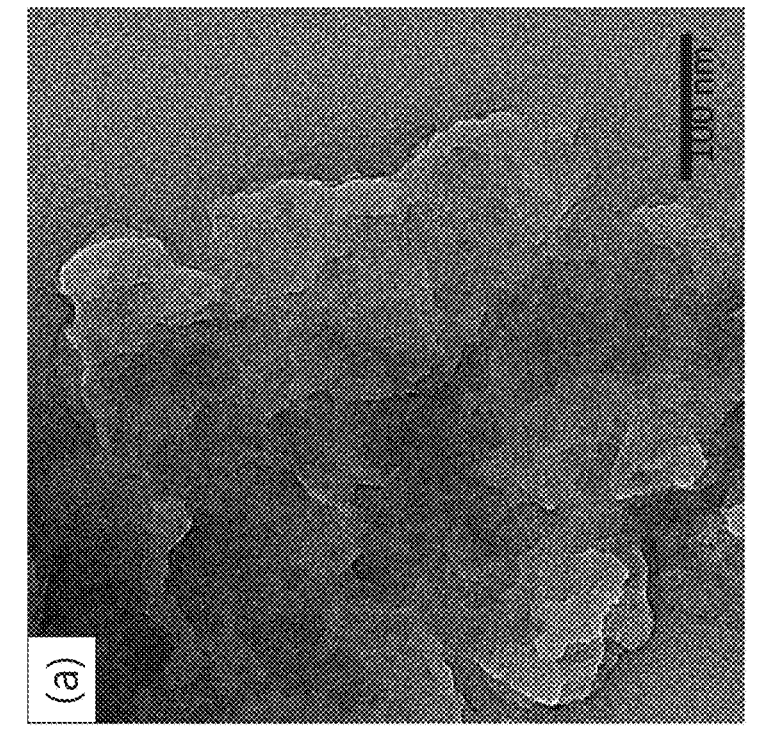
Figure 8

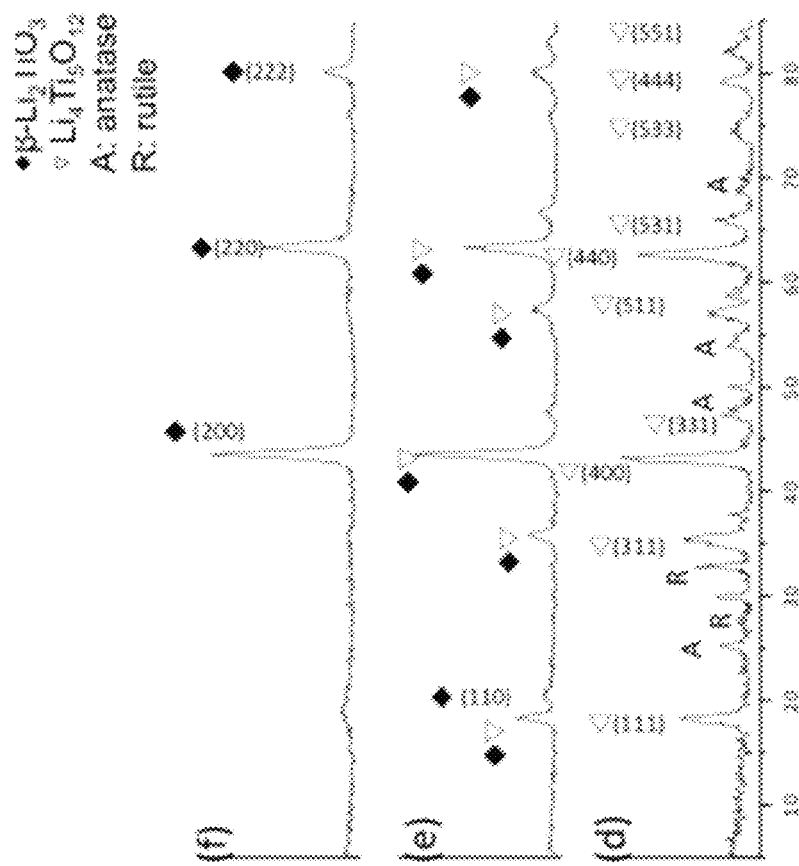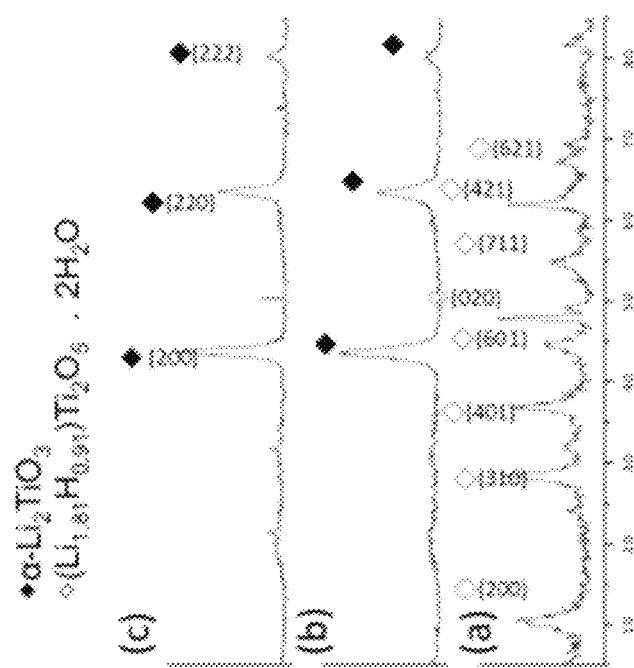
Figure 19A

LAYERED AND SPINEL LITHIUM TITANATES AND PROCESSES FOR PREPARING THE SAME

FIELD OF THE INVENTION

The present invention relates generally to the production of lithium titanates. More particularly, it relates to a process for preparing layered and spinel lithium titanate, as well as the products obtained from this process, and the use thereof exemplarily as electrode material in electrochemical energy storage devices.

BACKGROUND OF THE INVENTION

Currently the clean-energy technologies are experiencing a surge in popularity, this surge being driven by rising demands for high-output and fuel-efficient energy with reduced or no dependence on the petroleum industry.

Among the various clean-energy technologies, the electrochemical energy storage technologies—especially lithium-ion batteries—attract a lot of attention owing to their relatively low mass and high energy density. The lithium-ion battery (LIB) is widely used in consumer electronics such as cell phones, portable computers and cameras, where it has over 90% of the market and wherein the market value is expected to reach US$43 billion by 2020.

In addition to the mature market in consumer electronics, a key growing market for LIBs is in electric power storage grids and in the automotive and transportation industry, especially in electric vehicles. With the growing demand to reduce carbon dioxide emissions and dependence on fossil fuel energy and with the ever-increasing interest in sustainable ecologically-friendly high-efficiency energy systems, an electrochemical energy storage device such as the LIB provides a viable alternative. By 2015, the automotive LIB market value is expected to reach US$9 billion.

The most important requirements for automotive lithium ion battery are reasonable cost, high electrochemical performance (fast charging/discharging times), long service life (including reliability in abusive situations such as thermal or mechanical shocking) and high safety.

Conventional LIB design comprises an electrolyte, a lithium cobalt dioxide ($LiCoO_2$) cathode and a graphite anode. During the discharge phase of the LIB, the intercalated lithium in graphite is released and migrates towards the cathode. At the same time, electrons flow to the cathode, generating electricity.

Traditionally, graphite is the most commonly used anode material in LIBs. However graphite-based LIBs exhibit several weaknesses, including:
- at full-charged state, lithiated graphite electrodes are highly reactive;
- thermal degradation of passivation films occurs at temperatures in the range of 100-150° C., resulting in thermal runaway which leads to a violent exothermic reaction or explosion;
- low working voltage, close to that of metallic lithium.

These weaknesses contribute to safety concerns.

While in terms of the cathode, lithium iron phosphate ($LiFePO_4$) is the cathode material of choice for automotive applications, as anode graphite is not considered viable for electric vehicles, hence the interest in lithium titanate. Of the numerous lithium titanate compositions, $Li_4Ti_5O_{12}$ (LTO) is a preferred electrode material—it is safe and good for high-rate and long-life automotive LIBs.

Graphite is a relatively inexpensive material and it has a very good capacity, but it suffers from relatively poor safety (due to formation of the so-called "solid electrolyte interface (SEI)"), short lifetime and slow charging/discharging characteristics (low performance). By comparison, lithium titanate (LTO) has a capacity of only 175 $mAhg^{-1}$, a value 50% that of graphite, but advantageously has zero strain during charging/discharging phases (i.e. a volume change of only 0.2% during lithium ion intercalation) which leads to long service life and 100× shorter charging time than graphite, negligible to no Li-deposition when overcharging and no solid electrolyte interface (owing to its high and flat working voltage, 1.55V) which makes lithium titanate extremely safe (Table I). Moreover, the relatively small particle size of LTO is beneficial to the diffusion of lithium into the crystal structure. Consequently, lithium titanate-based LIBs are well-suited to the automotive industry and are in use in all kinds of vehicles, including electric vehicles (EV) and plug-in hybrid electric vehicles (PHEV).

TABLE 1

Comparison of electrode material: $Li_4Ti_5O_{12}$ (LTO) vs. Graphite

|  | $Li_4Ti_5O12$ (LTO) | Graphite |
|---|---|---|
| Volume Change | 0.2% (zero strain) | 12% |
| Lithium Diffusion Coefficient | $10^{-8}$ $cm^2s^{-1}$ | $10^{-10}$-$10^{-11}$ $cm^2s^{-1}$ |
| Working Voltage vs $Li^+/Li$ (V) | 1.55 | ~0.1 |
| Solid Electrolyte Interface (SEI) | none to inconsiderable | forming in $1^{st}$ charge |
| Theoretical Capacity (mAh $g^{-1}$) | 175 | 372 |

As can be seen from the pseudo-binary phase diagram of the $Li_2O$—$TiO_2$ system (FIG. 1—prior art), the region of $Li_4Ti_5O_{12}$ (LTO) is extremely narrow thus making the preparation of phase-pure LTO difficult. LTO is usually produced via formation (or use) of an intermediate Ti-oxide phase that is converted by thermal treatment to the final product. The existing routes to synthesize LTO include solid state, hydrothermal and sol-gel processes (graphically summarized in FIG. 2). For solid state synthesis, the quality of the products can be of concern. The titanium source compound (usually titanium dioxide, $TiO_2$) and the lithium source compound (usually lithium carbonate, $Li_2CO_3$) are annealed at high temperature, usually over 750° C., so as to obtain relatively pure well-crystalline LTO, but this results in primary particle coarsening and inhomogeneous composites. The product obtained via solid-state synthesis must therefore be ground thoroughly, which may result in further impurities. Sol-gel processes can prepare high-quality nanostructured LTO, but the large amounts of organic solvent and chelating agent (which are expensive and highly polluting) as well as the necessary high temperature annealing step and the processes' relatively poor scale-up features impede the adoption of sol-gel processes for low-cost and high-volume production. Hydrothermal processes advantageously can more readily achieve nanosized particle products, however high-purity products are not easily produced and hydrothermal processes are generally more expensive than their solid state counterparts due to the high cost of precursor material such as titanium isopropoxide (TTIP), and the high-pressure equipment required.

Patent application WO 2010/052362 discloses a lithium titanate product, the formula of which is of the form $Li_xTi_yO_z$ wherein when y is 1, the x:y molar ratio is 1.1-1.8, while the z:y molar ratio is 2.0-4.5. In addition, a process of preparing alkali metal titanate is described. In the process, an aqueous titanium-containing slurry is prepared and mixed with an alkali metal compound forming alkali metal titanate. The alkali metal compound is preferably an alkali metal hydroxide, preferably lithium hydroxide. The aqueous, titanium-containing slurry is comprised essentially of sodium titanate and is preferably prepared from titanyl sulphate, preferably prepared from an ilmenite concentrate by means of sulphuric acid and by thermal hydrolysis into titanium dioxide hydrate. The presence of sulphuric acid results in hazardous by-products necessitating proper safe disposal and hence additional cost.

Patent specification JP9309727 discloses a process for producing dense, flaky or plate-like lithium titanate by carrying out heat treatment of lithium titanate hydrate obtained by reacting a specific titanic acid compound with a lithium compound in water. A titanium compound is reacted with an ammonium compound in water to produce a titanic acid compound. The titanic acid compound is then reacted with a lithium compound in an aqueous solution of ammonium compound, and the reaction product is dried to give lithium titanate hydrate. The presence of ammonia presents technical problems such as the evaporation of ammonia when the pH rises above 7 and the nitrogen in the used solution which presents an environmental problem requiring further processing before safe disposal.

Liu et al. (*Electrochim. Acta*, 2012, 63, 100-104) discloses a microwave-assisted hydrothermal method for the synthesis of $Li_4Ti_5O_{12}$. In Liu et al., hydrothermal treatment of a solution containing titanium isopropoxide as precursor, LiOH plus $H_2O_2$ is carried out at 130-170° C. to prepare an intermediate that is subsequently transformed to LTO by calcination at 550° C. One of the intermediates—the one produced at 130° C.—was lithium titanate hydrate (LTH). The use of a non-conventional energy intensive method as is microwave-assisted hydrothermal in combination with the use of a high cost organic titanium precursor (TIP) remain serious limiting factors to scale up and commercial feasibility.

The present invention provides a way to produce high purity nano-structured LTOs that is cost effective as well as more ecological as compared to conventional processes for producing LTOs. The LTO materials of the present invention are useful in a variety of applications including energy storage devices such as LIBs.

SUMMARY OF THE INVENTION

In accordance with an aspect of the present invention, there is therefore provided a process for producing lithium titanate (LTO), which includes the steps of:
(a) providing a lithium titanate hydrate (LTH) intermediate of Formula I: $(Li_{2-x}H_x)Ti_2O_5 \cdot nH_2O$, wherein $0 \leq x \leq 0.5$, or wherein $0.1 \leq x \leq 0.3$, or wherein $0.15 \leq x \leq 0.25$; wherein $0 < n < 4$, or wherein $1 \leq n \leq 3$, or $n=2$; and
(b) thermally treating (also called annealing) the LTH intermediate of Formula I to produce the lithium titanate.

In accordance to another embodiment of the present invention, the step of providing a LTH intermediate comprises synthesizing the LTH intermediate via aqueous chemical processing.

According to this embodiment of the invention, the LTH intermediate of step (a) is synthesized at a temperature ranging from 0° C. to 100° C. According to an embodiment, synthesizing the LTH intermediate may include mixing of precursor compounds at a temperature less than ambient (i.e. below 20° C.), separating the resultant precipitate as a wet gel, and aging the latter at a temperature less than 100° C., with or without stirring for up to 36 hours. The aging may further comprise the addition of an aqueous LiOH solution to the separated precipitate, and heating at a temperature less than 100° C., with or without stirring, preferably with stirring.

According to one embodiment of the invention, the lithium titanate hydrate (LTH) intermediate of Formula I is $(Li_{1.81}H_{0.19})Ti_2O_5 \cdot 2H_2O$.

The lithium titanate hydrate intermediate of formula I may be synthesized by mixing a titanium-containing compound with a lithium-containing compound in a solvent to produce a lithium-titanium precursor mixture. The mixing may further include adding a dopant-containing compound. According to an embodiment of the invention, the titanium-containing compound comprises titanium tetrachloride, $TiCl_4$, the lithium-containing compound comprises lithium hydroxide, LiOH, and the solvent is water. The mixing of the titanium-containing compound with a lithium-containing compound in a solvent occurs at a temperature below 10° C. to form an initial precipitate that upon aging at a higher temperature (20-100° C. or 80° C. preferably) as mentioned above, converts to the LTH intermediate.

The resulting LTH intermediate so obtained may optionally be recovered by filtering, washing and drying.

In accordance to a particular embodiment of the invention, in step b, thermally treating the LTH intermediate to produce the lithium titanate includes heating the lithium LTH in the temperature range from preferably 350° C. to 700° C. and preferably for 1 to 12 hours.

According to an embodiment of the invention, the lithium titanate is $Li_4Ti_5O_{12}$, preferably spinel $Li_4Ti_5O_{12}$ with space group Fd3m. Also according to embodiments of the invention the lithium titanate comprises a nanostructure, for example a nanoparticle or nanosheet, structure. Additionally, the lithium titanate may be doped.

In accordance with a further embodiment of the present invention, there is also provided a lithium-ion battery or an electrode, which comprises the lithium titanate obtained according to the process of the present invention. In one embodiment, the electrode is an anode.

Other features and advantages of the present invention will be better understood upon reading of the description herein below with reference to the appended drawings.

BRIEF DESCRIPTION OF THE DRAWINGS

FIG. 3 Comparison of an embodiment of the process of the present invention with various lithium titanate production processes.

FIG. 4 Comparison of an embodiment of the process of the present invention with various lithium titanate production methods.

FIG. 7(b) is a diagram showing a process for producing LTH intermediate and LTO in accordance with an embodiment of the present invention. In this option the cold neutralized slurry is heated prior to S/L separation and aging of the gel.

FIG. 8(a) is a scanning electron microscope (SEM) image of the microstructure of a sample of LTH intermediate prepared in accordance with an embodiment of the process of the present invention.

FIG. 8(b) is a scanning electron microscope (SEM) image of the microstructure of a sample of $Li_4Ti_5O_{12}$ (LTO) produced from the LTH intermediate in accordance with an embodiment of the process of the present invention; the LTO was produced after 1.5 hours of annealing at 400° C. of the LTH intermediate.

FIG. 8(c) is an x-ray diffractogram (XRD) of the sample of $Li_4Ti_5O_{12}$ (LTO) produced from the LTH intermediate in accordance with an embodiment of the process of the present invention as in 8(b).

FIG. 19A presents XRD diffractograms of intermediate LTH with different Li/Ti ratio: (a) 4, (b) 6, and (c) 8, prepared at 50° C., and (d)-(f) are diffractograms showing LTO obtained after 500° C. annealing for 1.5 hours of (a)-(c) intermediates.

DETAILED DESCRIPTION OF THE INVENTION

Figure 1:
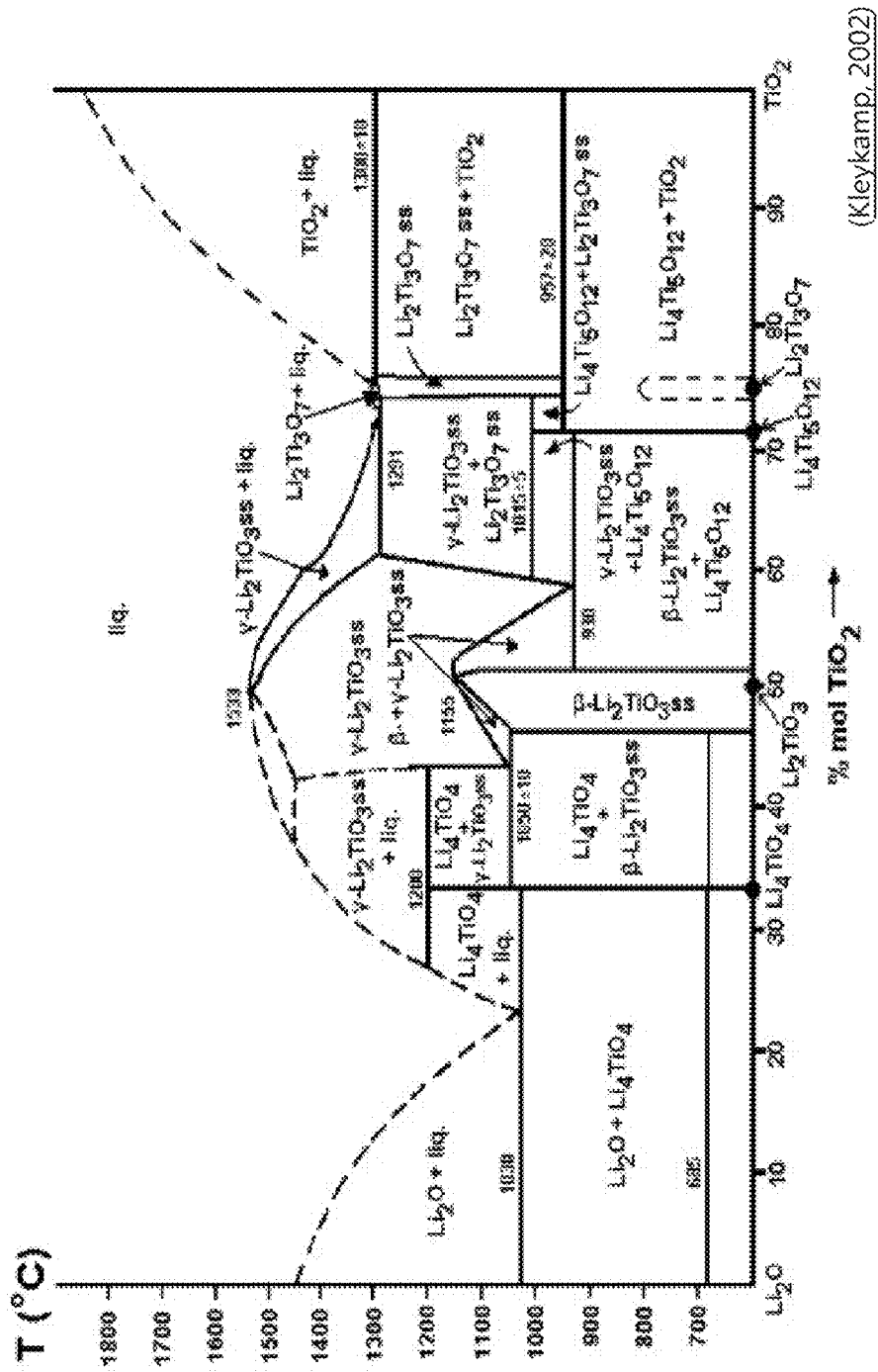
FIG. 1 is a pseudo-binary phase diagram of the $Li_2O$—$TiO_2$ system. [prior art]
Figure 2:
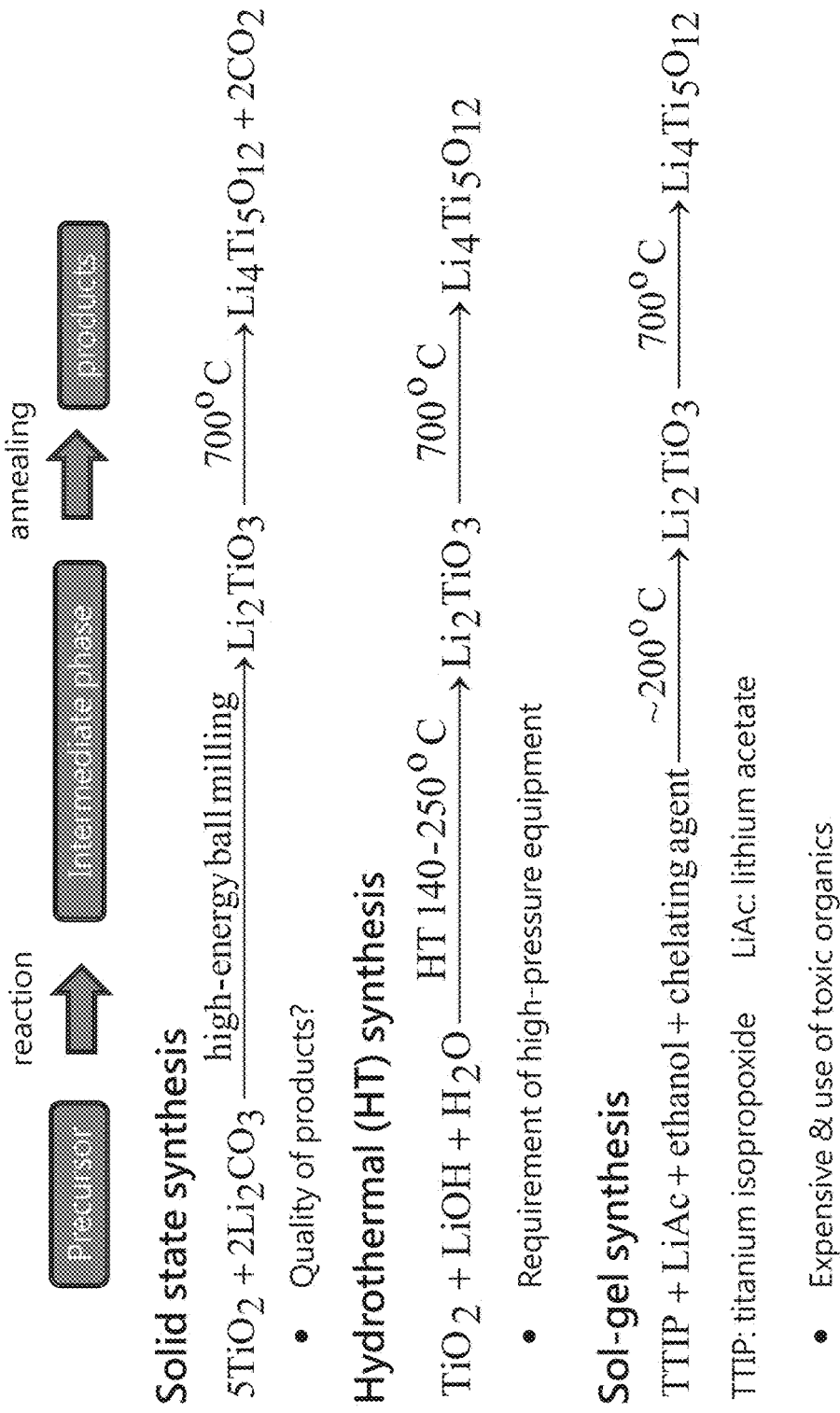
FIG. 2 Existing conventional synthesis processes (solid-state, hydrothermal, and sol-gel processes) for $Li_4Ti_5O_{12}$ (LTO). [prior art]
Figure 5:
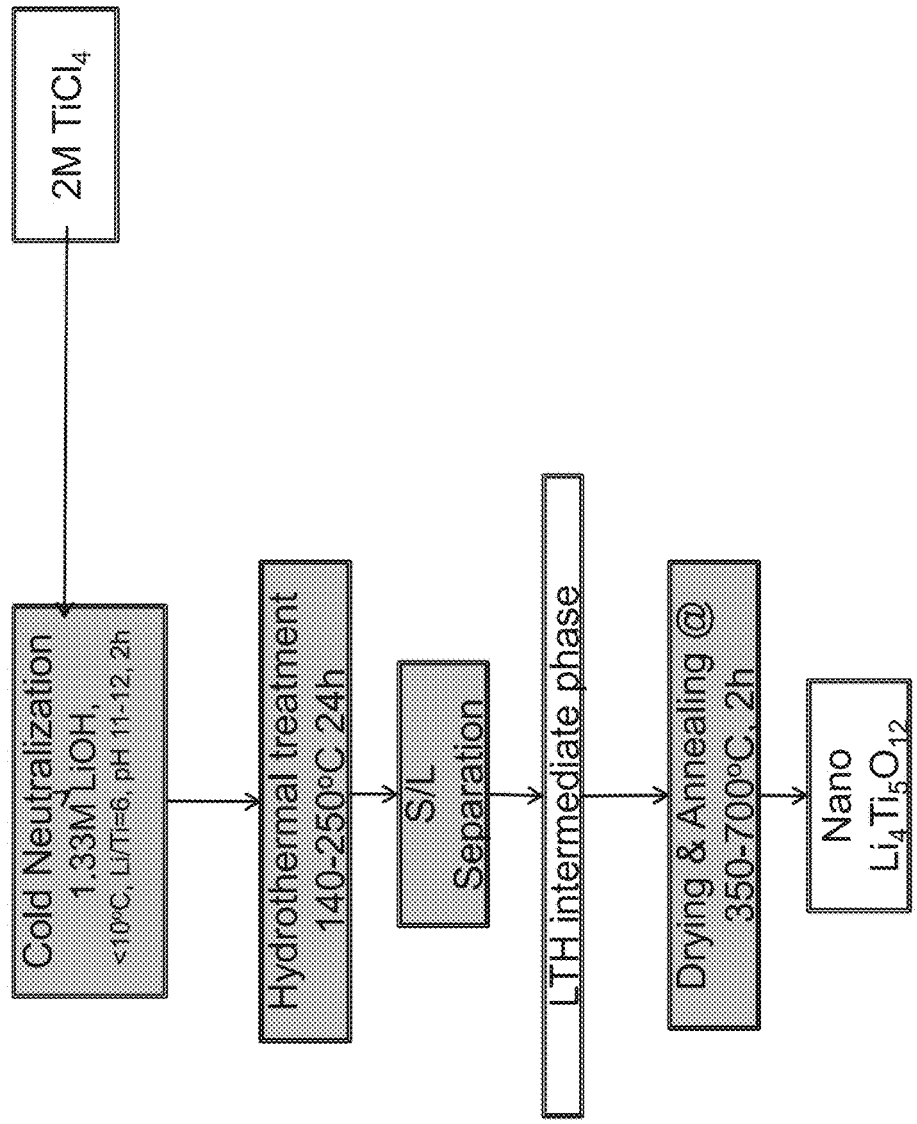
FIG. 5 is a flowchart showing a process for producing LTH intermediate and LTO, which includes a hydrothermal treatment step.

According to one embodiment of the present invention, there is provided a process for producing lithium titanate (LTO) which includes the steps of:
(a) providing a lithium titanate hydrate (LTH) intermediate of formula I: $(Li_{2-x}H_x)Ti_2O_5 \cdot nH_2O$, wherein $0 \leq x \leq 0.5$, wherein $0.1 \leq x \leq 0.3$, or wherein $0.15 \leq x \leq 0.25$; wherein $0 < n < 4$, wherein $1 \leq n \leq 3$, or $n=2$; and
(b) thermally treating the LTH intermediate of formula I to produce the lithium titanate (LTO).

In accordance to another embodiment of the invention, the step of providing a LTH comprises synthesizing the LTH via aqueous chemical processing.

Aqueous Chemical Synthesis of the LTH Intermediate

In accordance to a particular embodiment, the LTH intermediate of step a) is synthesized via aqueous chemical processing.

Accordingly, synthesizing the LTH intermediate may include mixing a titanium-containing compound with a lithium-containing compound in a solvent to produce a lithium-titanium precursor mixture. For example, the ratio Li/Ti of the titanium-containing compound and lithium-containing compound is above 4, preferably between 4 and 8, and more preferably of about 6. To tailor the electrochemical properties of the final lithium titanate product, dopant-containing compound may be mixed along with the lithium-containing compound and titanium-containing compound into the solvent. According to embodiments of the invention, synthesizing the lithium titanate hydrate intermediate occurs at a temperature range from 0° C. to 100° C.

The lithium-containing compound may be selected, for example, from the group consisting of LiOH, $LiNO_3$, LiCl, $Li_2CO_3$, $Li_2O$, $LiHCO_3$, $Li_2SO_4$ and lithium acetate. When LiOH is used in the process of the present invention, it serves both as source of lithium (Li) ions and as alkaline reagent providing an alkaline pH environment for the synthesis process. Non-alkaline or low-alkaline lithium-containing compounds may be used with a "foreign" base, for example $NH_4OH$, to provide a desired alkaline pH environment.

The titanium-containing compound according to embodiments of the invention includes, for example, titanium tetrachloride ($TiCl_4$). $TiCl_4$ is commonly used as raw material for industrial production of pigment, and it is hence cost-effective. $TiCl_4$ is organic-free and hence is also environmentally friendly. Nevertheless, the titanium-containing compound may include a titanium tetraalkoxide such as titanium tetraisopropoxide and titanium tetrabutoxide for example.

For a doped lithium titanate $Li_4Ti_5O_{12}$ final product, different dopant-containing compounds may be mixed along with the lithium- and titanium-containing compounds. Soluble compounds, including acetate, nitrate, chloride and the like for example, comprising one or more of the following metal elements Al, Mg, Ga, Fe, Co, Se, Y, Mn, Ni, Cr, V, or following anions $Cl^-$, $Br^-$ or $F^-$, may be used as the doping-containing compounds. Other dopants may be used according to other embodiments of the invention.

The term "solvent" means the medium in which the compounds are dissolved. The solvent may comprise, for example, a mixture of organic solvent and water, or water. Examples of organic solvents include alkyl ketone and lower alkyl alcohols, such as acetone or ethanol. According to embodiments of the invention, the solvent is water; it may be distilled water or deionized water to avoid introducing impurities.

Figure 6:
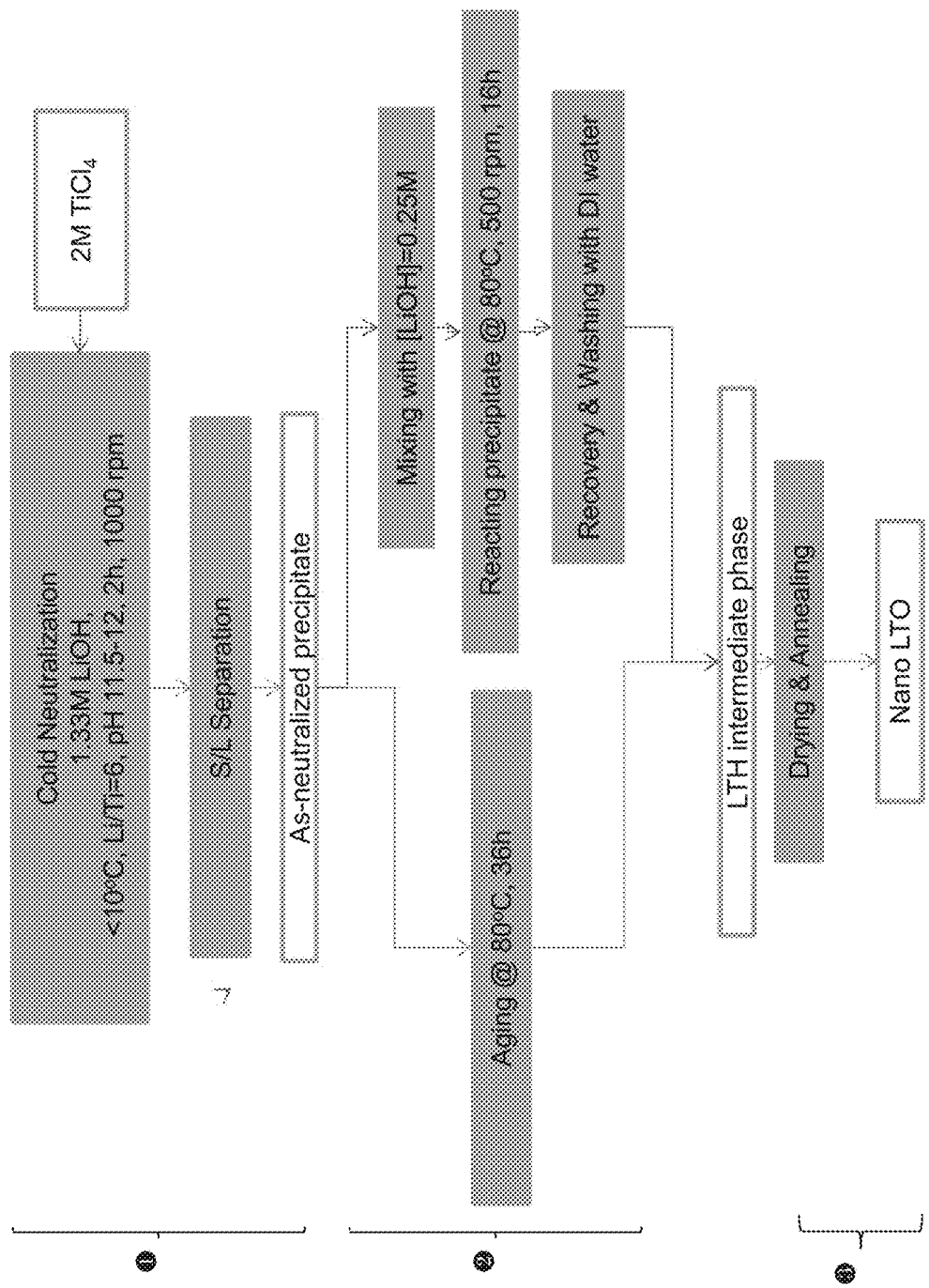
FIG. 6 is a flowchart showing a process for producing LTH intermediate and LTO in accordance with an embodiment of the present invention, which does not include a hydrothermal treatment step.
Figure 7:
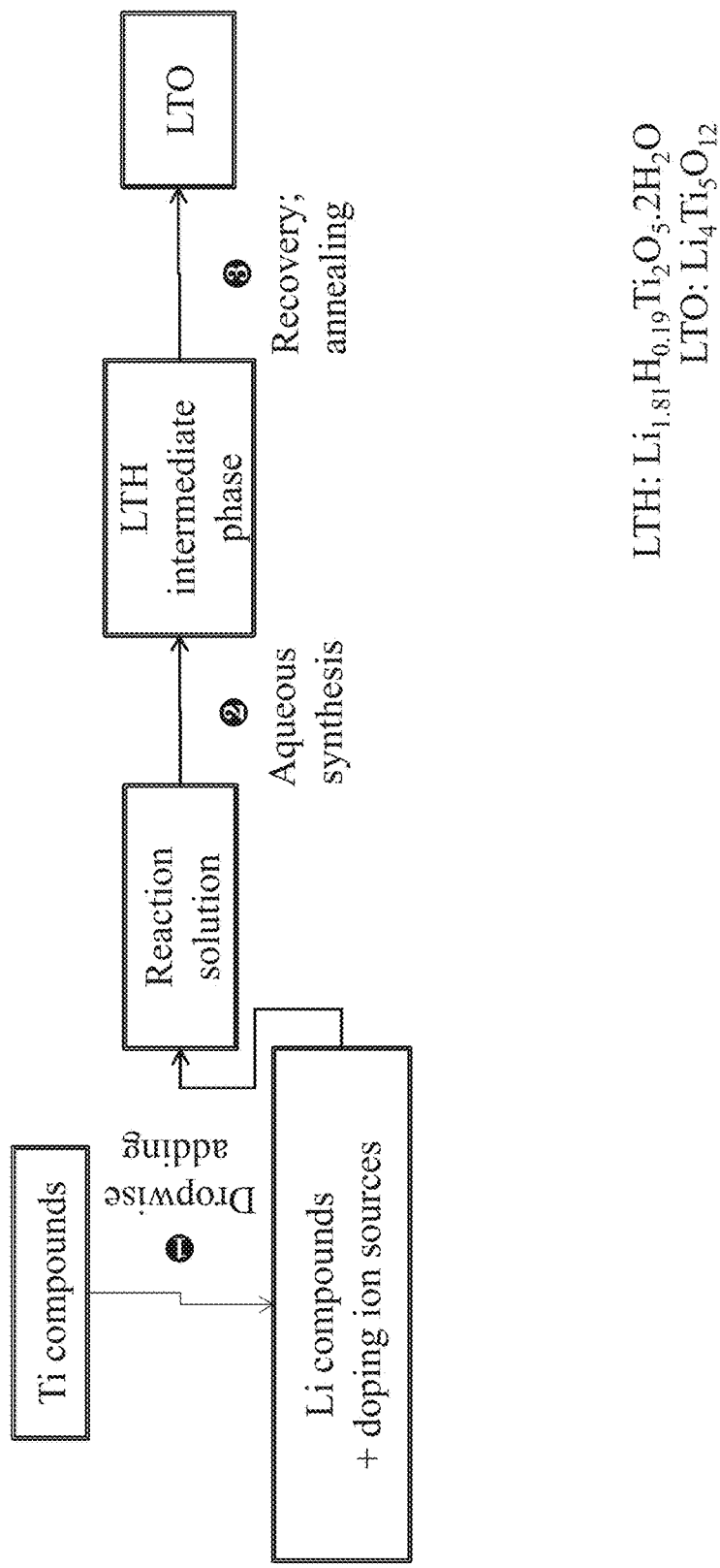
FIG. 7(*a*) is a diagram showing a process for producing LTH intermediate and LTO in accordance with an embodiment of the present invention.
Figure 7:
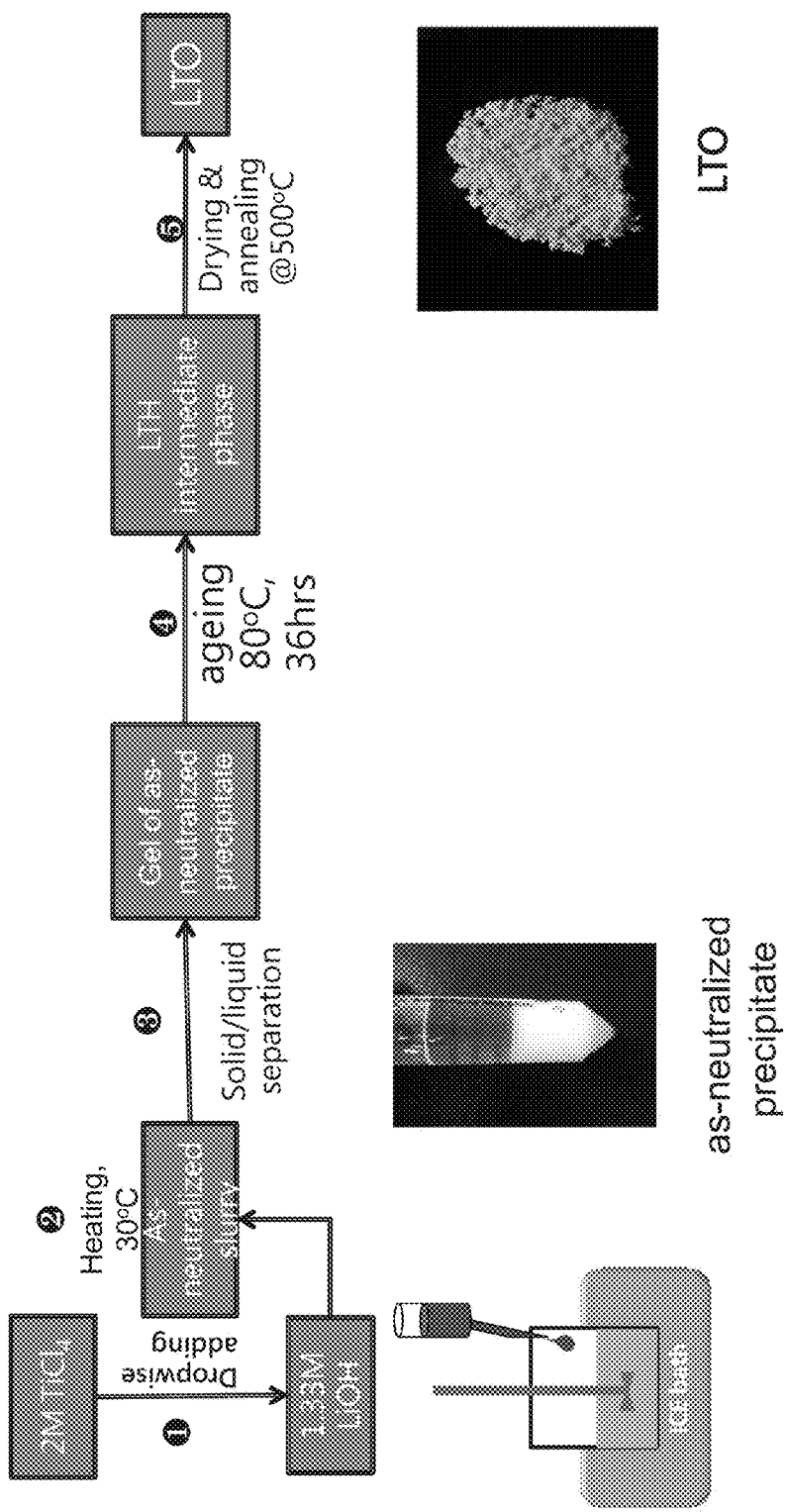

According to one embodiment of the invention, the lithium-containing compound (along with any dopant-containing compounds) is added and mixed into the solvent. Then the titanium-containing compound is added slowly (for example, using a drop-wise technique) and mixed (for example, via stirring) into the solvent to produce the lithium-titanium precursor mixture that is homogeneous, although other non-homogenous mixtures may be employed. The mixing of the compounds is according to embodiments of the invention done at a temperature below 10° C. to favour the nucleation of the LTH intermediate; such mixing is also termed "cold neutralisation" (FIG. 6). In a preferred embodiment, the mixing is carried out in an alkaline pH, preferably a pH of 9 or higher, more preferably at a pH of 10 or higher. Cold neutralization may be followed by heating at room temperature to 100° C. (FIG. 7) to promote crystallization before the as-neutralized precipitate (gel) is separated and subjected to aging at temperatures T<100° C. (FIGS. 6 and 7) in order to produce the LTH intermediate according to the present invention.

In accordance to one embodiment, the neutralized precipitate is allowed to stand in a step called aging at a temperature ranging from room temperature (RT) to 100° C. for several hours (up to 36 hours) without stirring.

In accordance to another embodiment, the neutralized precipitate is allowed to stand in a step called aging at a temperature ranging from room temperature (RT) to 100° C. for several hours (up to 36 hours) with stirring. For example, stirring may be carried out at a constant rate ranging from 200 rpm to 1000 rpm, for example about 500 rpm.

In accordance to both of the above embodiments, aging further comprises the addition of the recovered precipitate in an aqueous lithium hydroxide solution with or without stirring, preferably, the concentration of the aqueous lithium hydroxide solution is in the range of 0.1 to 0.6 M, more preferably of 0.2 to 0.4 M, or most preferably 0.25 to 0.3 M.

Via the aqueous reaction process of the invention, (as exemplified by FIGS. 6 and 7) the synthesis of the LTH intermediate may be advantageously accomplished. According to an embodiment, the LTH intermediate produced responds to the formula: $(Li_{2-x}H_x)Ti_2O_5 \cdot nH_2O$, wherein $0 \leq x \leq 0.5$, or wherein $0.1 \leq x \leq 0.3$, or wherein $0.15 \leq x \leq 0.25$. In one embodiment, the LTH intermediate prepared is $(Li_{1.81}H_{0.19})Ti_2O_5 \cdot 2H_2O$.

According to another embodiment, 0.2M $TiCl_4$ aqueous solution is mixed with LiOH having a concentration in the range of 0.2 to 1.5 M at 10-100° C. under constant agitation for 0.5 to 6 hours.

The LTH intermediate may be layered $(Li_{1.81}H_{0.19})Ti_2O_5 \cdot 2H_2O$ with a base-centered (C) orthorhombic crystal structure with lattice constant $a_0=1.662$ Å, $b_0=3.797$ Å, $c_0=3.007$ Å.

To recover the LTH intermediate from the processed mixture, for example to recover the as-neutralized precipitate (FIG. 6) from the synthesis liquor or after aging in a LiOH solution (FIG. 6, on the right), phase separation techniques, such as filtration, washing, centrifuging, may be applied according to embodiments of the invention. The precipitate may then be dried at a temperature in the range of 30° C.-100° C.

According to embodiments of the invention, the process of the invention allows for the production of the LTH intermediate while bypassing the formation of undesirable intermediate phases, such as $Li_2TiO_3$ or amorphous/anatase/rutile $TiO_2$ that can complicate the downstream production of pure nanosized lithium titanate LTO.

Thermal Treatment of LTH Intermediate for the Production of Lithium Titanate (LTO)

One advantage of converting lithium titanate hydrate (LTH) intermediate phase into lithium titanate (LTO) is its higher theoretical Li/Ti ratio, which is 0.905, than 0.8 of $Li_4Ti_5O_{12}$. The over-stoichiometric ratio with uniform distribution in atomic scale can compensate for Li loss during annealing, and provide high homogeneity and purity in the final LTO product.

In accordance to a particular embodiment of the invention, after recovering the LTH intermediate, the precipitate of LTH intermediate may be annealed by heating to 350-700° C. for 1-12 hours to produce the lithium titanate, for example $Li_4Ti_5O_{12}$ (LTO) and more specifically spinel $Li_4Ti_5O_{12}$. Further grinding (mechanical grinding or high-energy ball-milling) to reduce particle size is normally not required unless it is necessary for a particular application.

A low annealing temperature in the range of 400-600° C. and a 1- to 6-hour annealing time may be employed according to embodiments of the invention to avoid hard agglomeration or further grain growth during annealing.

As compared to conventional solid-state synthesis processes, a much lower temperature and reaction time may be chosen due to the formation of the LTH intermediate which allows the transformation to the spinel LTO to be triggered at a temperature in the range of 350-450° C., for example.

The proposed advanced aqueous-based process of the invention to synthesize lithium titanate is scalable as well as potentially more environmentally-friendly and cost-effective than current methods. It offers the possibility to use inexpensive inorganic raw materials and to carry out the synthesis at a relatively low temperature (lower than boiling point of water) and hence reduce the energy demand of the process. The process of the invention also allows for reproducible control of the synthesis conditions to avoid undesirable by-products for optimum performance of the LTO product as electrode in LIBs.

FIGS. 2 to 7 provide a means of comparing various existing LTO production processes (synthetic, conventional solid-state, traditional wet chemical) to one embodiment of the process of the present invention (advanced aqueous chemical).

The invention is also directed to a lithium titanate obtained according to the process defined above. The lithium titanate obtained is, according to embodiments of the invention, $Li_4Ti_5O_{12}$ (LTO), and more specifically spinel $Li_4Ti_5O_{12}$. Advantageously, the process may yield LTO of relatively high purity and of finer nanostructure which implies that the product is phase-pure, i.e. any undesired phase (e.g. rutile or $Li_2TiO_3$) that may be present in the end-product is negligible. It is possible, according to embodiments of the invention, to achieve nanostructured spinel LTO of particle size below 100 nm, and for example in the range of from 5 to 80 nm, from 50 to 80 nm, or from 5 to 50 nm. Of course, a high-purity nanostructured LTO-containing electrode is of benefit for use as an electrode in LIBs.

EXAMPLES

The following non-limiting examples illustrate the invention. These examples and the invention will be better understood with reference to the accompanying figures.

Example 1

A sample of LTH intermediate prepared in accordance with an embodiment of the process of the present invention was examined using scanning electron microscopy. FIG. 8(a) shows the scanning electron microscope (SEM) image of the microstructure of the obtained LTH intermediate.

After annealing the LTH intermediate sample for 1.5 hours at 400° C., the product was analysed using x-ray diffraction (XRD) and scanning electron microscopy (SEM). The x-ray diffraction identified the product as $Li_4Ti_5O_{12}$ (LTO) [see FIG. 8(c)]. FIG. 8(b) is a scanning electron microscope (SEM) image of the microstructure of the sample of $Li_4Ti_5O_{12}$ (LTO).

Example 2

An LTH intermediate and LTO final product were produced according to the procedure illustrated in FIG. 6 (left side: aging of precipitate without stirring or LiOH addition).

a) Synthesis of LTH Intermediate:

A volume of 20 mL of a 2 M $TiCl_4$ aqueous solution was added dropwise to 180 mL of an ice-cold 1.33 M lithium hydroxide stirred aqueous solution (Li/Ti molar ratio=6). The temperature was maintained below 10° C. during addition. The terminal pH of the reaction was within the range of 11.5-12, and the mixture was stirred for an additional 2 hours. The as-neutralized precipitate was collected by centrifugation, and washed 3 times with deionized water. The recovered product was transferred to a closed vessel for aging at 80° C. without stirring during 36 hours. The LTH intermediate was then further dried in an oven at 80° C.

b) Annealing of LTH to Produce LTO:

The LTH intermediate obtained in step (a) was subjected to annealing for 2 hours at 400° C. to produce the desired LTO.

Three samples from the above process were then compared: LTH intermediate without aging, LTH intermediate with 80° C. aging, LTO after 400° C. annealing of the LTH intermediate.

Figure 9:
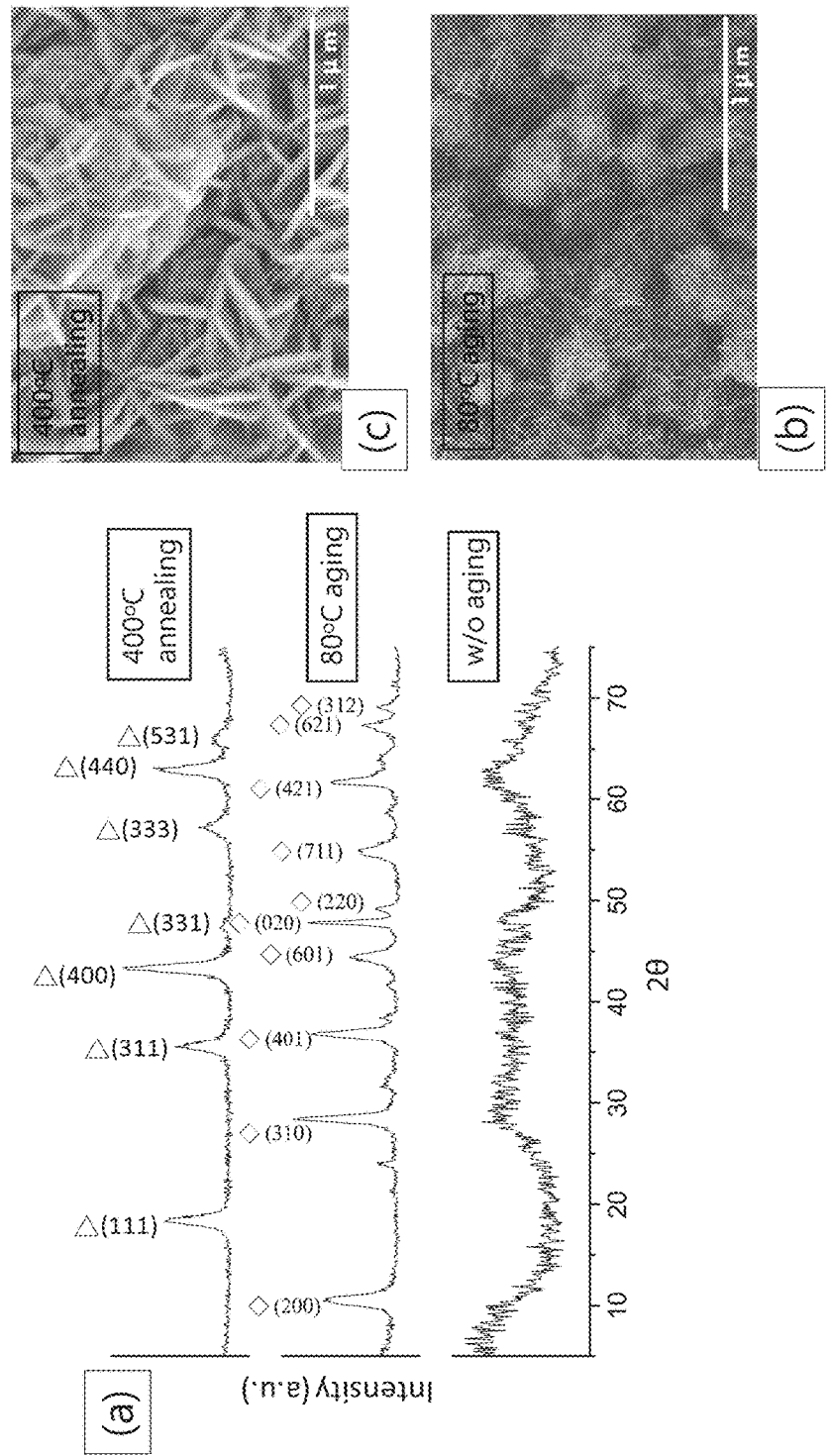
FIG. 9(a) shows x-ray diffractograms (XRD) of a sample of LTH intermediate before and after aging at 80° C., and after annealing at 400° C. confirming the production of LTO.
FIG. 9(b) is a scanning electron microscope (SEM) image of the microstructure of a sample of LTH intermediate obtained with 80° C. aging.
FIG. 9(c) is a scanning electron microscope (SEM) image of the microstructure of a sample of LTO produced from the LTH intermediate after 400° C. annealing of the LTH intermediate.

From x-ray diffraction, the sample without aging is mainly amorphous (FIG. 9(a), lower diffractogram). However, after aging at 80° C., highly crystalline lithium titanate hydrate (LTH) was prepared with a delicate nanostructure (see FIG. 9(a), second diffractogram). The top diffractogram of FIG. 9(a) also shows the characteristic LTO pattern obtained after annealing according to step (b) above.

From scanning electron microscopy, the prepared lithium titanate hydrate (LTH) is seen to have "nanosheet" (nanostructured) morphology. FIG. 9(b) is a scanning electron microscope (SEM) image of the microstructure of the sample of LTH intermediate obtained with 80° C. aging. FIG. 9(c) is a scanning electron microscope (SEM) image of the microstructure of the sample of LTO after 400° C. annealing of the LTH intermediate.

Example 3

Figure 10:
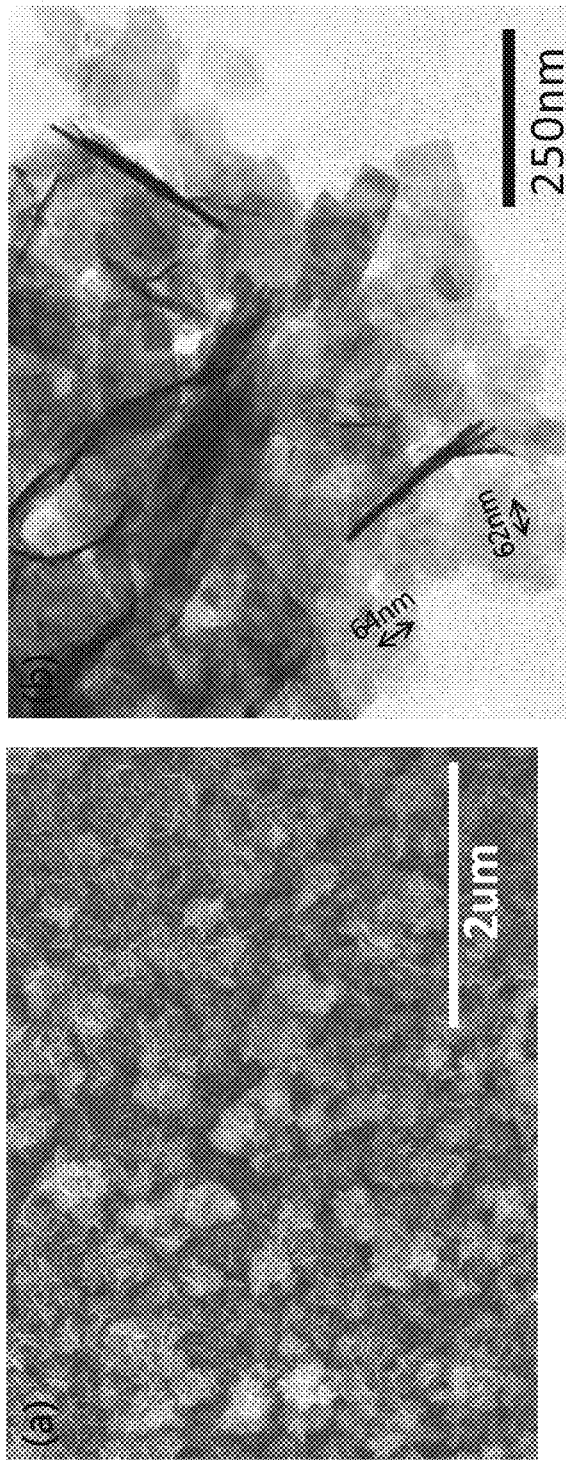
FIG. 10(a) is a scanning electron microscope (SEM) image of a sample of LTH intermediate showing the nanostructure of the LTH nanosheets; the LTH nanosheets are aggregated into a primary particle with a diameter of about 300 nm.
FIG. 10(b) is a transmission electron microscope (TEM) image of a sample of LTH intermediate; the LTH is comprised of many small sheets each of about 60 nm in size.

FIG. 10(a) is a SEM image of a sample of the LTH intermediate produced according to step (a) of Example 2, showing the nanostructure of the LTH nanosheet material; the LTH is aggregated into a primary particle with a diameter of about 300 nm.

FIG. 10(b) is a transmission electron microscope (TEM) image of a sample of LTH intermediate; the LTH is comprised of many small sheets each of about 60 nm in size.

Example 4

Lithium titanate hydrate (LTH) samples produced according to step (a) of Example 2 were annealed for 2 hours at: (a) 400° C., (b) 500° C., (c) 600° C., and (d) 700° C. The microstructure of the LTO samples was then analysed via SEM and XRD.

Figure 11:
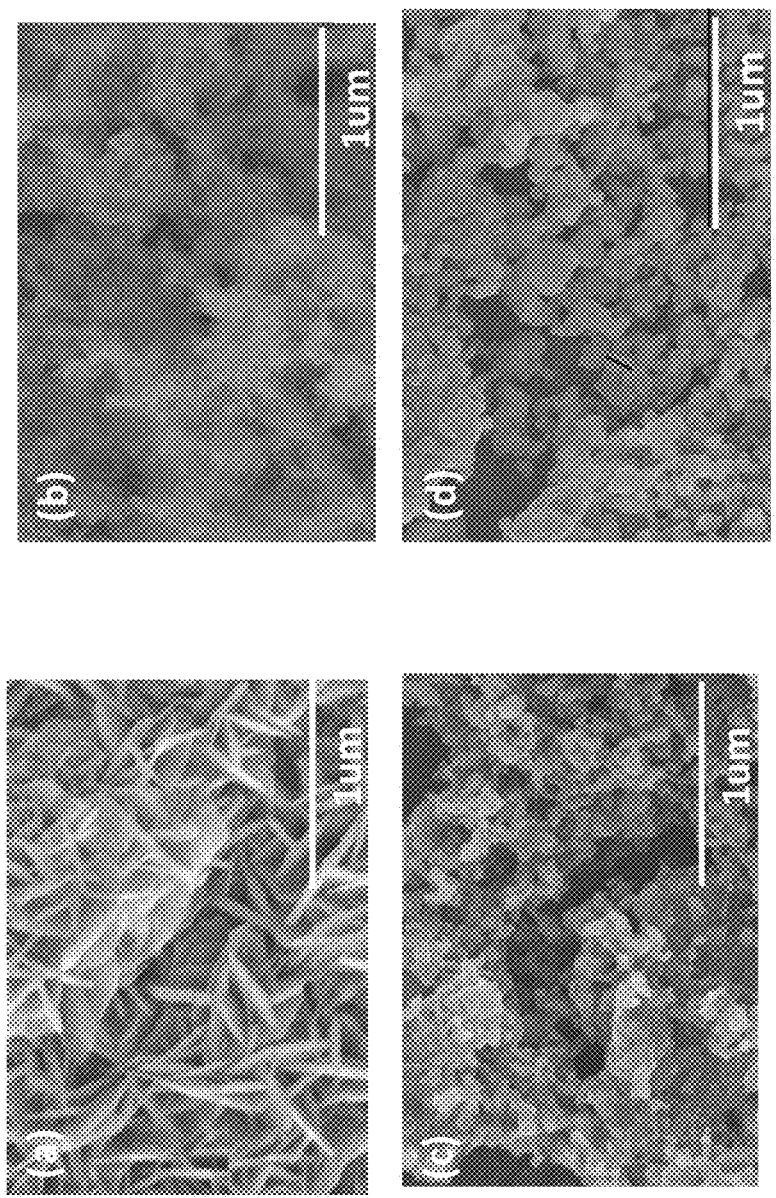
FIG. 11 presents SEM images of lithium titanate LTO samples after 2 hours annealing at: (a) 400° C., (b) 500° C., (c) 600° C., and (d) 700° C.; the images show the initial growth of the nanosheet structure and subsequent aggregation of the nanosheets into primary particles of about 100 nm in size.
Figure 12:
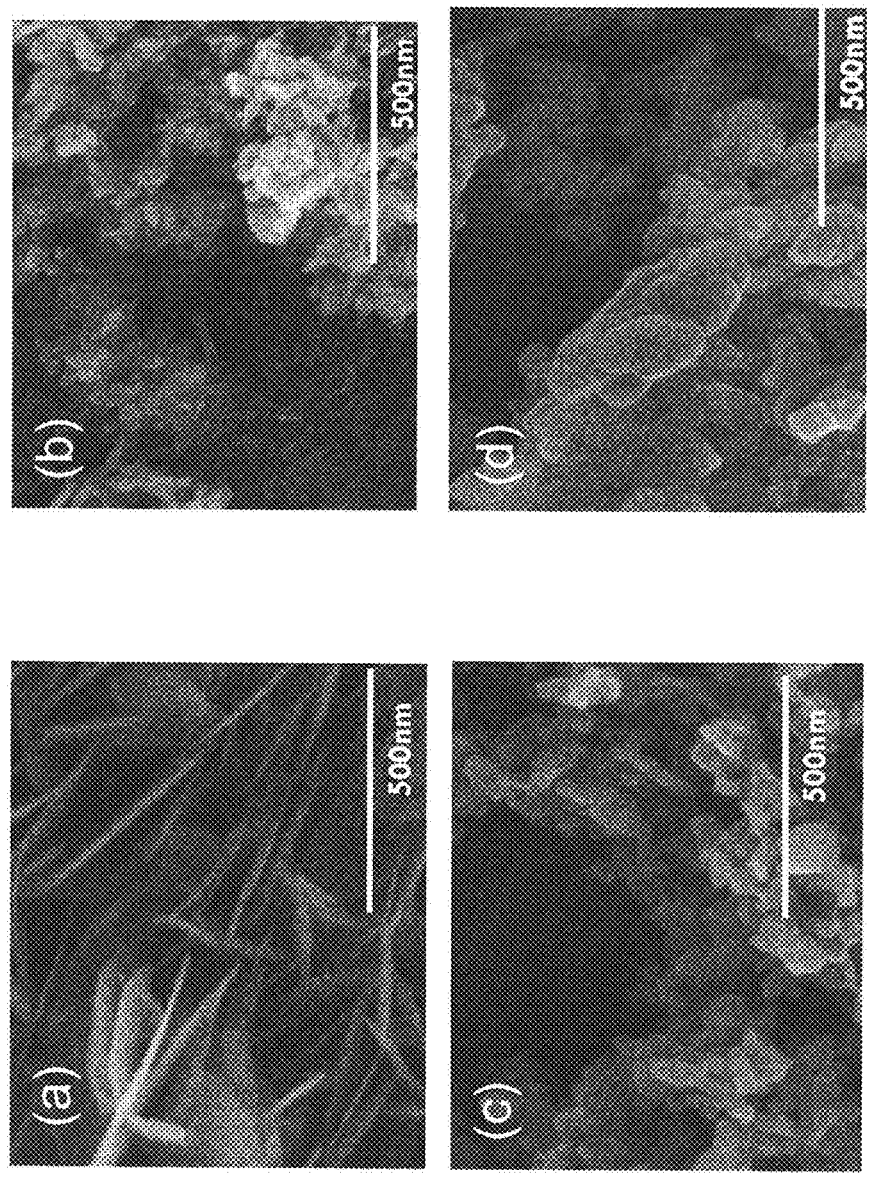
FIG. 12 presents high magnification SEM images of the lithium titanate LTO samples after 2 hours annealing at: (a) 400° C., (b) 500° C., (c) 600° C., and (d) 700° C.

SEM images of the samples [FIG. 11] show that after two-hour annealing at 400° C., the nanosheet structure is maintained while some modest growth is observed. The structure shown in FIG. 11(a) is in the form of 10 nm thick nanosheets with ~102 m²/g specific surface area. However, after two-hours annealing at 500° C., the nanosheet structure is seen to have collapsed, and with an increase in the annealing temperature, the morphology is seen to have changed into particles. Annealing at 600° C. for two hours resulted in nanoparticle LTO material with a specific surface area of about 28 m²/g. After two-hour annealing at 700° C., the particle size of the LTO has grown to 100 nm. FIG. 12 presents high magnification SEM images of the lithium titanate LTO samples after 2 hours annealing at: (a) 400° C., (b) 500° C., (c) 600° C., and (d) 700° C.

Figure 13:
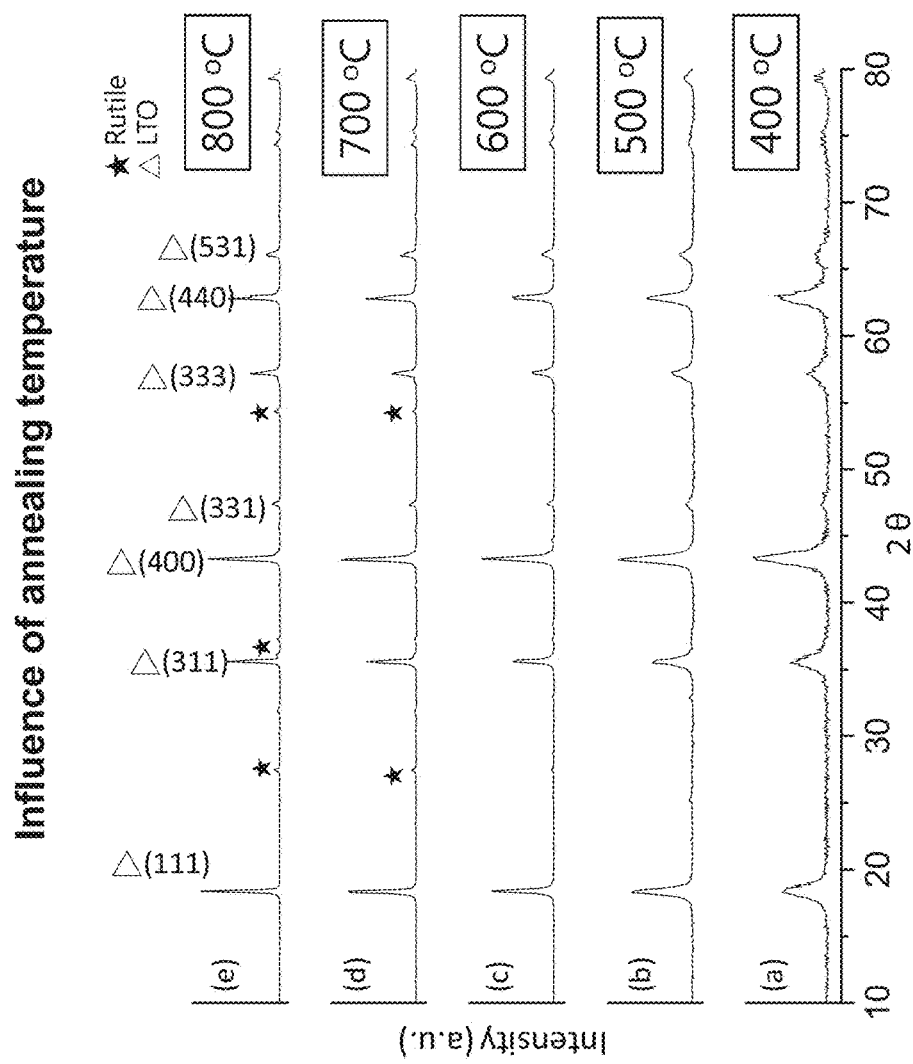
FIG. 13 presents XRD diffractograms of lithium titanate LTO samples after 2 hours annealing at: (a) 400° C., (b) 500° C., (c) 600° C., (d) 700° C., and (e) 800° C.; the diffractograms show the increase in crystallinity of the LTO samples with annealing temperature.
Figure 14:
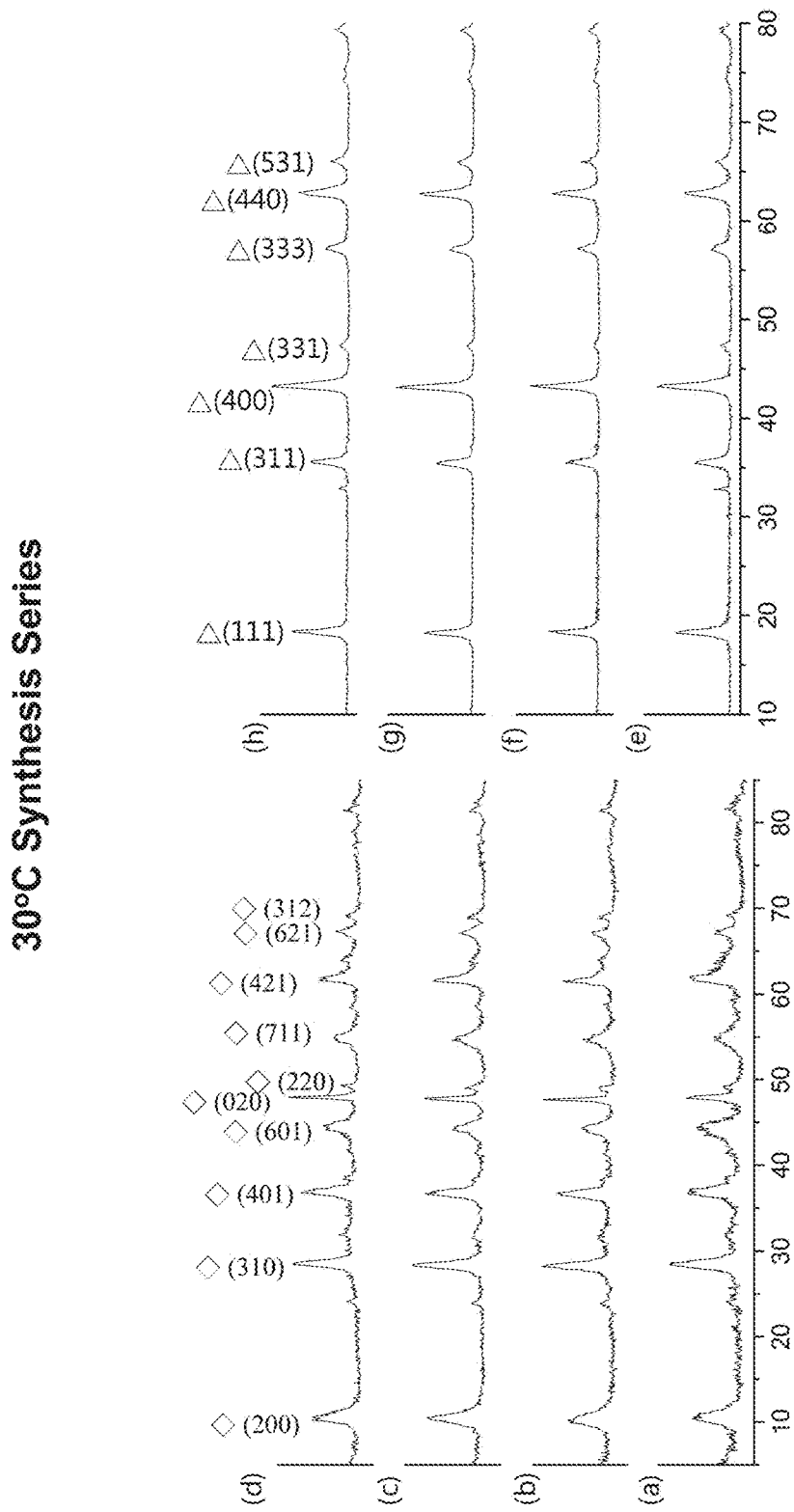
FIG. 14 presents XRD diffractograms of lithium titanate hydrate LTH samples: (a) as-precipitated at <10° C. with no additional heating; (b) as-precipitated at <10° C. then heated at 30° C. for 1 hour; (c) as-precipitated at <10° C. then heated at 30° C. for 3 hours; (d) as-precipitated at <10° C. then heated at 30° C. for 6 hours; (e) after annealing at 500° C. for 2 hours sample (a); (f) after annealing at 500° C. for 2 hours sample (b); (g) after annealing at 500° C. for 2 hours sample (c); and (h) after annealing at 500° C. for 2 hours sample (d).

From the XRD analysis, it can be seen that crystallinity of the LTO samples increased with annealing temperature. FIG. 13 presents XRD diffractograms of lithium titanate LTO samples after 2 hours annealing at: (a) 400° C., (b) 500° C., (c) 600° C., (d) 700° C., and (e) 800° C.; the diffractograms show the increase in crystallinity of the LTO samples with annealing temperature.

Example 5

Figures 15, 16:
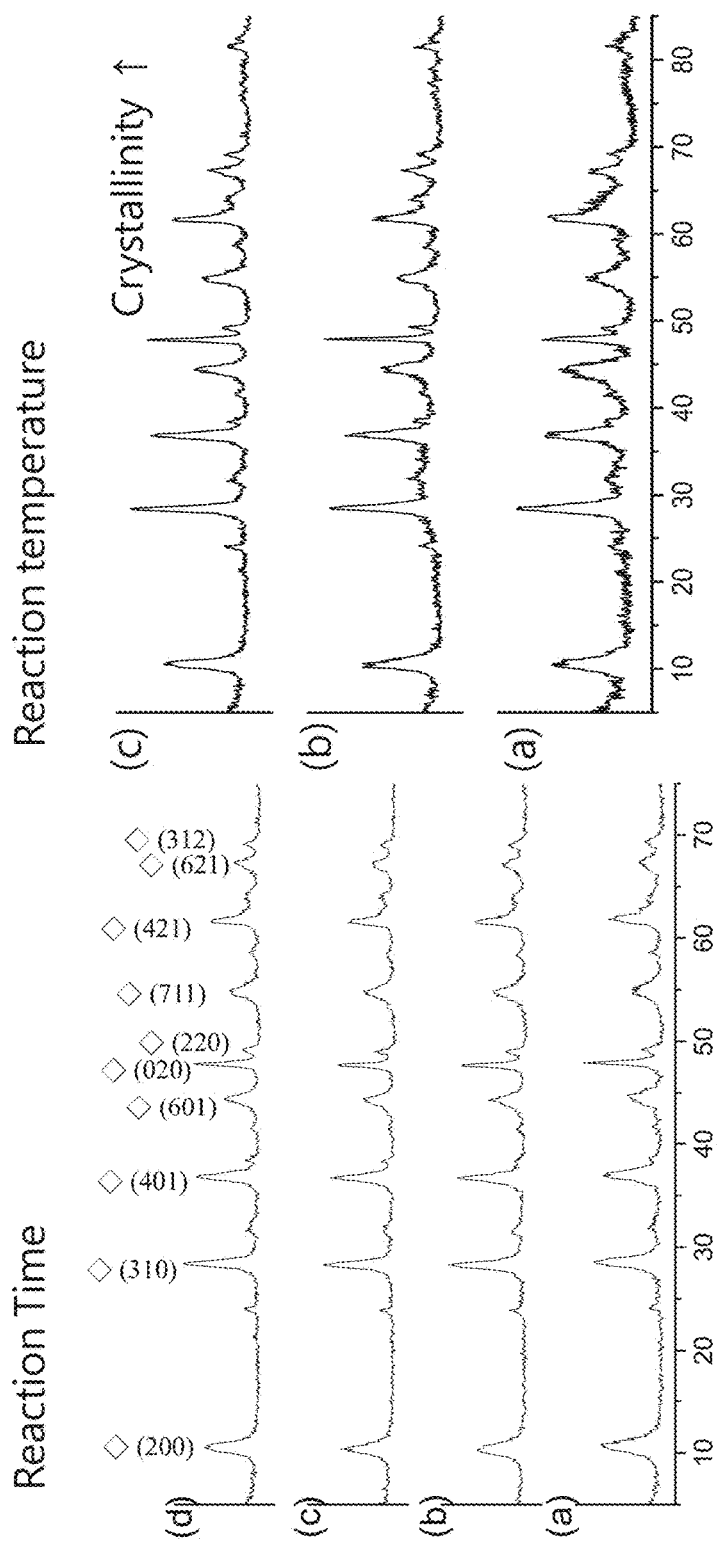
FIG. 15 presents XRD diffractograms of lithium titanate hydrate LTH samples prepared under the following conditions: (a) as-precipitated at <10° C. with no additional heating; (b) as-precipitated at <10° C. then heated at 50° C. for 1 hour; (c) as-precipitated at <10° C. then heated at 50° C. for 3 hours; and (d) as-precipitated at <10° C. then heated at 50° C. for 6 hours.
FIG. 16 presents XRD diffractograms of LTH samples prepared by neutralization at <10° C. for 2 hours (a) without heating, (b) with heating at 30° C., (c) with heating at 50° C. for 6 hours; then aging each of the samples at 80° C. for 36 hours, and drying at 80° C.

FIG. 15 presents XRD diffractograms of lithium titanate hydrate LTH samples produced under various conditions: (a) as-precipitated at a temperature below 10° C. with no additional heating, (b) as-precipitated at a temperature below 10° C. then heated at 50° C. for 1 hour, (c) as-precipitated at a temperature below 10° C. then heated at 50° C. for 3 hours, and (d) as-precipitated at a temperature below 10° C. then heated at 50° C. for 6 hours.

FIG. 16 presents XRD diffractograms of LTH samples prepared by neutralization at a temperature maintained below 10° C. for 2 hours: (a) without heating, (b) with heating at 30° C., (c) with heating at 50° C. for 6 hours; then aging each of the samples at 80° C. for 36 hours, and drying at 80° C. for 12 hours. The XRD analysis shows an increasing trend in the crystallinity of the LTH samples.

Example 6

Figure 17:
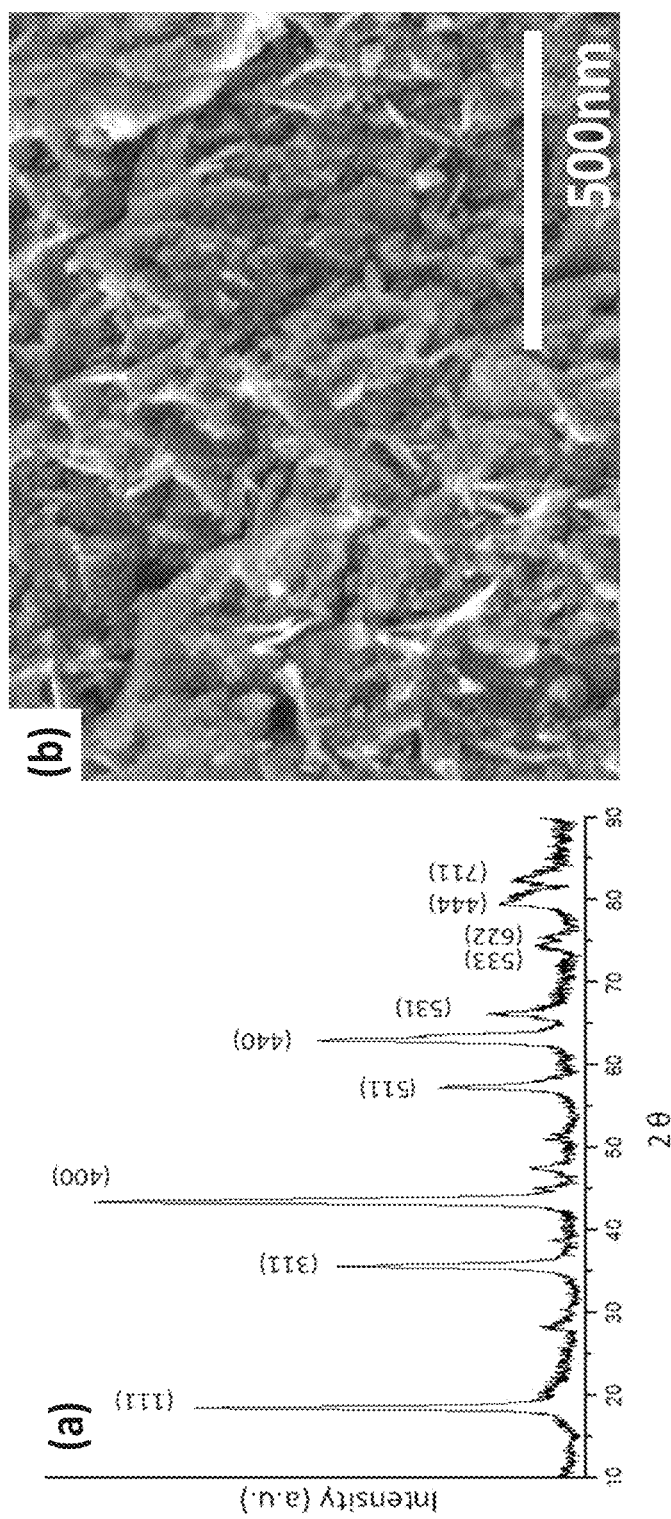
FIG. 17 shows (a) a XRD diffractogram and (b) a SEM image of the spinel LTO sample obtained after annealing at 400° C. for 2 hours.

According to another embodiment, the lithium titanate hydrate (LTH) intermediate can also be prepared by mixing 1.3M LiOH and 1.33M $TiCl_4$ solutions as illustrated in step 1 of FIG. 7(a), with Li/Ti molar ratio equal to 6. This aqueous chemical processing involves neutralization and in situ aging at 50° C. for 2 hours. The LTH intermediate is then annealed at 400° C. for 2 hours to obtain a phase-pure spinel LTO sample. FIG. 17 shows (a) an XRD diffractogram and (b) a SEM image of the spinel LTO sample obtained after annealing at 400° C. for 2 hours.

According to the present invention, it was found that the surface area of layered LTO may be larger than 80 $m^2/g$, for example in the range of 90-110 $m^2/g$, which corresponds to a particle size in the range of 15-40 nm. Surprisingly, the surface area of spinel LTO which is obtained from layered LTO after annealing is in the range of 20-30 $m^2/g$ without any post treatment such as grinding, corresponding to the isotropically growing nanosheet structures. According to FIG. 17(b), there is some agglomeration among primary particles of spinel LTO nanosheets; further grinding may be carried out to obtain finer LTO for specific applications.

Example 7

Specific conditions, namely reaction pH, compound ratios, and aging temperature/time for the formation of the LTH intermediate were studied. The results obtained are illustrated in FIGS. 18 and 19A,B.

Figure 18:
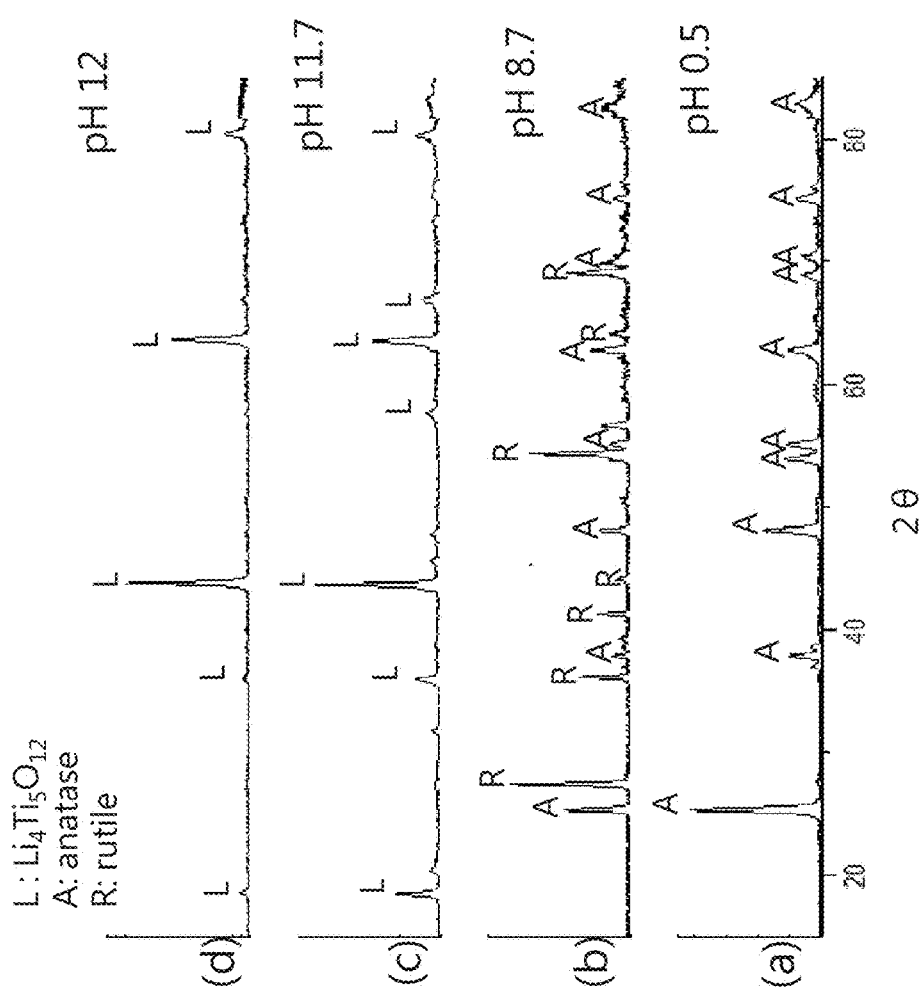
FIG. 18 presents XRD diffractograms of samples produced by annealing at 700° C. for 2 hours of LTH intermediates that were synthesized in different pH environments: (a) pH 0.5, (b) pH 8.7, (c) pH 11.7, and (d) pH 12.

FIG. 18 shows XRD diffractograms of samples produced from LTH intermediates that were prepared in different pH environments during "cold neutralization" (refer to FIG. 6) of (a) pH 0.5; (b) pH 8.7; (c) pH 11.7; and (d) pH 12, followed by aging at 80° and then annealed at 700° C. In an acidic environment, the sample produced contained $TiO_2$ and the anatase phase. In a neutral or slightly basic environment (pH 7-9), the sample produced contained a mixture of rutile and anatase. When the pH value was increased to higher than 10, the sample produced after annealing contained the desired LTO phase with little to no impurities.

FIG. 19A (a),(b),(c) shows XRD diffractograms of LTH intermediate samples prepared as in example 6 (neutralization and aging at 50° C. for 2 hours) with varying initial concentrations of reactants, LiOH and $TiCl_4$, expressed as Li/Ti molar ratio. In one trial, when the ratio of LiOH and $TiCl_4$, Li/Ti, was 4, the sample prepared contained the intermediate phase LTH. In another trial, when Li/Ti is 6 or 8, the sample contained the non-desirable $\alpha$-$Li_2TiO_3$ phase. After annealing at 500° C. for 2 hours, the sample with a Li/Ti ratio of 8 (FIG. 19A(f)) yielded $\beta$-$Li_2TiO_3$ instead of the desired LTO while the samples with Li/Ti ratio of 4 and 6 (FIG. 19A (d),(e)) yielded LTO but with variable types of contaminants, like beta-$Li_2TiO_3$, Anatase or Rutile.

Figure 19B:
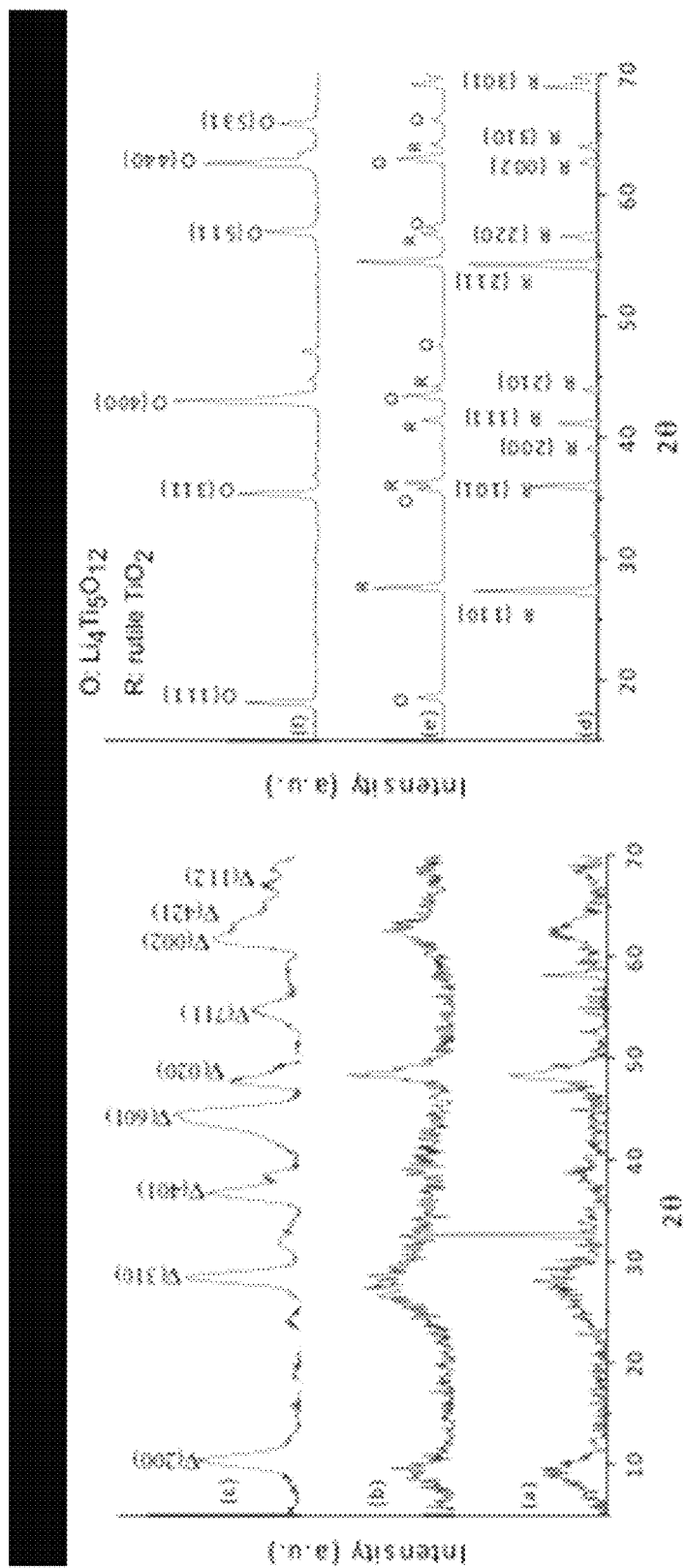
FIG. 19B presents XRD diffractograms of intermediate LTH with different Li/Ti ratio: (a) 0.8, (b) 2, and (c) 6, prepared by cold neutralization (T<10° C.) and aging of the precipitate at 100° C. for 24 hours. (d)-(f) are diffractograms showing LTO obtained after 700° C. annealing for 1.5 hours of (a)-(c) intermediates.

FIG. 19B (a),(b),(c) shows XRD diffractograms of intermediate LTH samples prepared with varying initial concentrations of reactants, LiOH and $TiCl_4$, expressed as Li/Ti molar ratio. The preparation involved cold neutralization at T<10° C. followed by aging of the precipitate at 100° C. for 24 hours. In one trial, when the ratio of LiOH and $TiCl_4$, Li/Ti, was 6, the sample prepared contained the intermediate phase LTH (FIG. 19B(c)). In another trial, when Li/Ti is 2 or 0.8, the sample contained the protonated titanate $H_2Ti_2O_5$ with poor crystallinity. After annealing at 700° C. for 1.5 hours, the sample with Li/Ti=0.8 was converted into pure rutile $TiO_2$ instead the desired LTO; Li/Ti=2 yielded a mixture of $TiO_2$ and lithium titanate (LTO). However the LTH prepared with Li/Ti=6 yielded only lithium titanate (LTO) after annealing.

Example 8 a) Preparation of Electrochemical Cells

To test the electrochemical performance of the nanostructured LTO produced in Examples 4(a) annealed at 400° C., and 4(c) annealed at 600° C., coin cells in which a metallic lithium foil was used as the counter electrode were prepared. The employed organic electrolyte was a mixture of 1M $LiPF_6$ with ethylene carbonate (EC), diethyl carbonate (DEC) in a ratio 3:7 (volume ratio) with 2 wt % by total weight of vinylene carbonate (VC) as an additive. The composite electrodes were made of the active material, synthesized nanostructured LTO, (89 wt %), conductive carbon black (6 wt %) and polyvinylidene fluoride (PVDF) binder (5 wt %) homogeneously dispersed in N-methyl pyrrolidinone (NMP), coated on Al-foil. The loading of prepared electrodes was 4.73±0.04 $mg/cm^2$ for the 400° C. annealed LTO and 4.12±0.02 $mg/cm^2$ for the 600° C. annealed LTO. Then, these electrodes were dried at 110° C. in vacuum for 12 hours. The coin cells were assembled in an argon-filled glove box (M. Braun Co., $[O_2]$<1 ppm, $[H_2O]$<1 ppm). Each of the two nanostructured LTO materials exhibited unique electrochemical performance properties as will be shown below.

b) Initial Charge/Discharge at C/24

Figure 20:
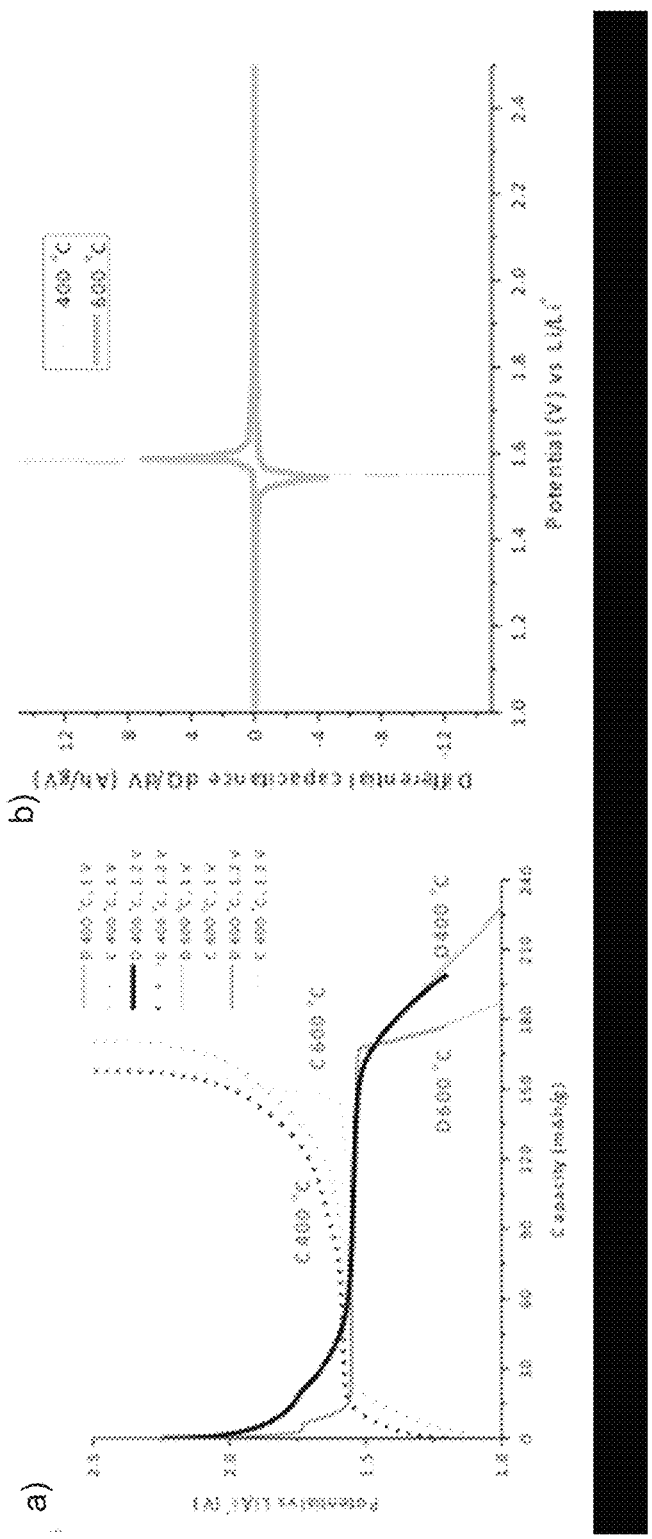
FIG. 20 presents (a) galvanostatic charge/discharge voltage profiles and (b) corresponding differential capacitance of lithium coin cells comprising LTOs of the invention, at C/24 in the potential range from 2.5 V to 1.0 V or 1.2 V vs. $Li/Li^+$.

The electrochemical performance of the cells, including rate capability and charge/discharge capacity, was then evaluated at room temperature. A constant current protocol (C/24) was used for formation cycles in the potential range from 2.5 V to the cutoff voltage of 1.0 V and 1.2 V vs. $Li/Li^+$, respectively. The galvanostatic discharge/charge voltage and corresponding differential capacitance are shown in FIG. 20. Table 2 summarizes the initial charge/discharge capacity data for the two LTO materials (Ex, 4(a) from 400° C. annealing, and Ex. 4(c) from 600° C. annealing).

TABLE 2

Initial charge/discharge capacity in C/24 formation cycle

| LTO | Cut-off voltage vs. Li/Li+ (V) | Capacity (mAh/g) Charge | Capacity (mAh/g) Discharge | Efficiency (%) |
|---|---|---|---|---|
| Ex. 4(a) | 1 | 170.3 | 228.3 | 74.6 |
| (400° C.) | 1.2 | 187.2 | 199.6 | 93.8 |
| Ex. 4(c) | 1 | 162.4 | 187.3 | 86.7 |
| (600° C.) | 1.2 | 158.0 | 176.9 | 89.3 |

Thus the LTO nanosheets of Example 4(a) yielded a curved voltage profile typical of nanosized intercalation compounds with first discharge capacity equal to 228 mAh/g for 1.0 V cutoff at a C/24 rate. The LTO nanoparticles of Example 4(c) exhibited a voltage plateau at 1.55 V with first discharge capacity equal to 187.3 mAh/g, i.e. well above the theoretical value of 175 mAh/g.

c) Discharge Rate Performances

The discharge rate performances were also tested for the LTO containing cells, in which the charge rate was kept constant at 0.25 C. The discharge rate was varied from 1 C (0.74 mA/cm$^2$) to 15 C over the operating voltage range from 2.5 to 1.0 or 1.2 V vs. Li/Li+. Table 3 summarizes the initial capacity data at different discharge rates.

TABLE 3

Charge/discharge capacity at varying discharge rates

| LTO | Cut-off voltage vs. Li/Li+ (V) | Charge/discharge capacity (mAh/g) 0.25Ch/1D | 0.25Ch/4D | 0.25Ch/10D | 0.25Ch/15D |
|---|---|---|---|---|---|
| Ex. 4(a) | 1 | 157.5/151.3 | 143.0/133.7 | 110.7/88.1 | 77.8/17.6 |
|  | 1.2 | 155.4/153.5 | 151.4/146.6 | 137.5/131.9 | 132.3/115.0 |
| Ex. 4(c) | 1 | 159.6/158.5 | 154.6/151.3 | 133.0/110.1 | 108.9/5.4 |
|  | 1.2 | 156.6/155.2 | 152.5/150.0 | 134.9/127.7 | 126.3/68.4 |

It can be noted that both materials exhibited higher rate capability when the cutoff voltage was 1.2 V rather than 1.0 V. In other words the extra capacity afforded by the lower cutoff voltage (1.0 V) was lost upon increasing the discharge rate. This loss in capacity was more pronounced with the LTO nanosheet material (400° C.). At cutoff voltage 1.2 V both LTO nanomaterials exhibited essentially the same rate capability up to 10 C rate. Thus at 1 C rate the discharge capacity was 153.5 vs. 155.2 mAh/g, while at a 10 C rate the corresponding values for the LTO nanosheets and nanoparticles were 131.9 vs. 127.7 mAh/g respectively. However, at higher rate (15 C) the nanosheet LTO material performed better than the nanoparticle LTO material (115.0 vs. 68.4 mAh/g), which might be reflecting the shorter diffusion path characterizing nanosheets.

d) Cell Cyclability

The cyclability of the two nanostructured LTO materials was evaluated by 0.25 C charge and 1 C discharge over 130 cycles. The 600° C. annealed LTO material (nanoparticles) retained 97% capability after 130 cycles (at about 150 mAh/g), while the 400° C. annealed LTO nanosheets showed a 15% capacity loss, which might reflect their higher degree of crystallinity. Both materials, however, exhibited nearly 100% columbic efficiencies after a few cycles. In addition, the LTO nanosheet material's reversible capacity stabilized at about 135 mAh/g after 120 cycles.

Example 9

An LTH intermediate and LTO final product were also produced according to the following procedure procedure illustrated in FIG. 6 (right hand side: aging of precipitate in LiOH addition subjected to stirring).

a) Synthesis of LTH Intermediate:
  i. Neutralization:

A volume of 20 mL of a 2 M TiCl$_4$ aqueous solution was added drop wise to 180 mL of an ice-cold 1.33 M lithium hydroxide stirred (1000 rpm) aqueous solution (Li/Ti molar ratio=6). The temperature was maintained below 10° C. during addition. The terminal pH of the reaction was within the range of 11.5-12, and the mixture was stirred at 1000 rpm for 2 hours. The as-neutralized precipitate was separated by centrifugation at 6000 rpm, and washed 3 times with deionized water.

ii. Aging:

The washed precipitate (about 5-10 g) was added to 50 mL of a pre-prepared 0.25M LiOH solution and the mixture was stirred (500 rpm) at 80° C. for 16 hours. The precipitate was centrifuged and washed as in step (i). The LTH intermediate obtained was then further dried in an oven at 80° C. for 12 hours.

b) Annealing of LTH to Produce LTO:

The LTH intermediate obtained in step (a) is then subjected to annealing for 2 hours at a temperature of (i) 400° C., (ii) 500° C., and (iii) 600° C. The material obtained was then subjected to mild regrinding.

Figure 21:
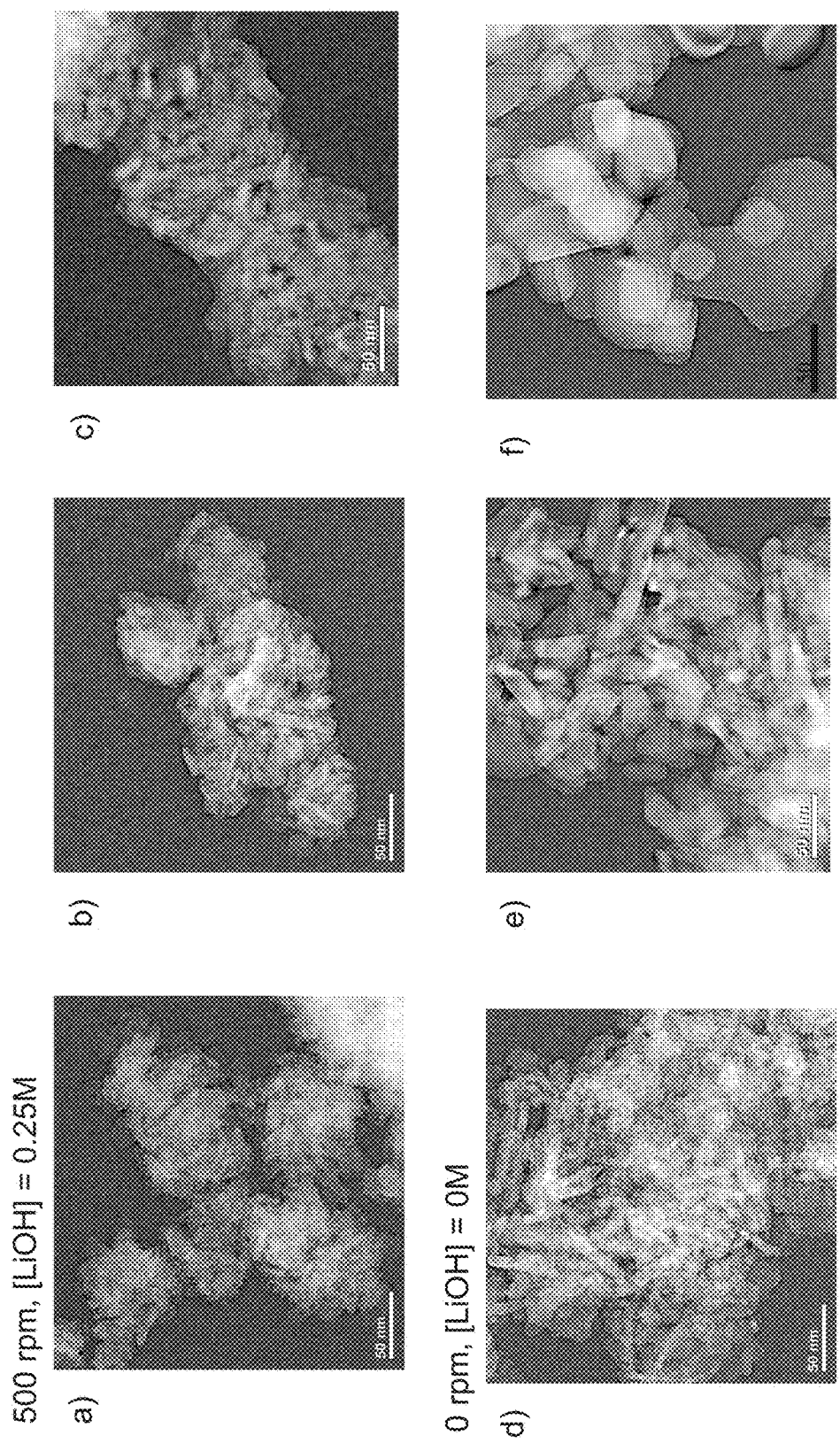
FIG. 21 shows transmission electron microscope (TEM) images of the LTO after annealing at (a) 400° C., (b) 500° C., and (c) 600° C. of a LTH obtained from aging with stirring in presence of LiOH; and annealing at (d) 400° C., (e) 500° C., and (f) 600° C. of a LTH obtained from aging without stirring or LiOH addition.

The morphology of the LTO obtained was compared with the LTO of Examples 4(a) to (c). For example, FIG. 21 shows transmission electron microscope (TEM) images of the LTO obtained by the above procedure and annealing at (a) 400° C., (b) 500° C., and (c) 600° C., while images (d), (e), and (f) were obtained with LTO resulting from the procedures of Example 4 at the same temperatures. The images show that the LTO annealing product of LTH obtained through an aging process involving agitation and LiOH 0.25M maintained a nanosheet structure at all three annealing temperatures. As a comparison, the nanosheet structure of the LTO annealing product of an LTH prepared as in Example 2 (aging step without agitation and LiOH) gradually collapsed and transformed into particulate material as the annealing temperature increased.

Figure 22:
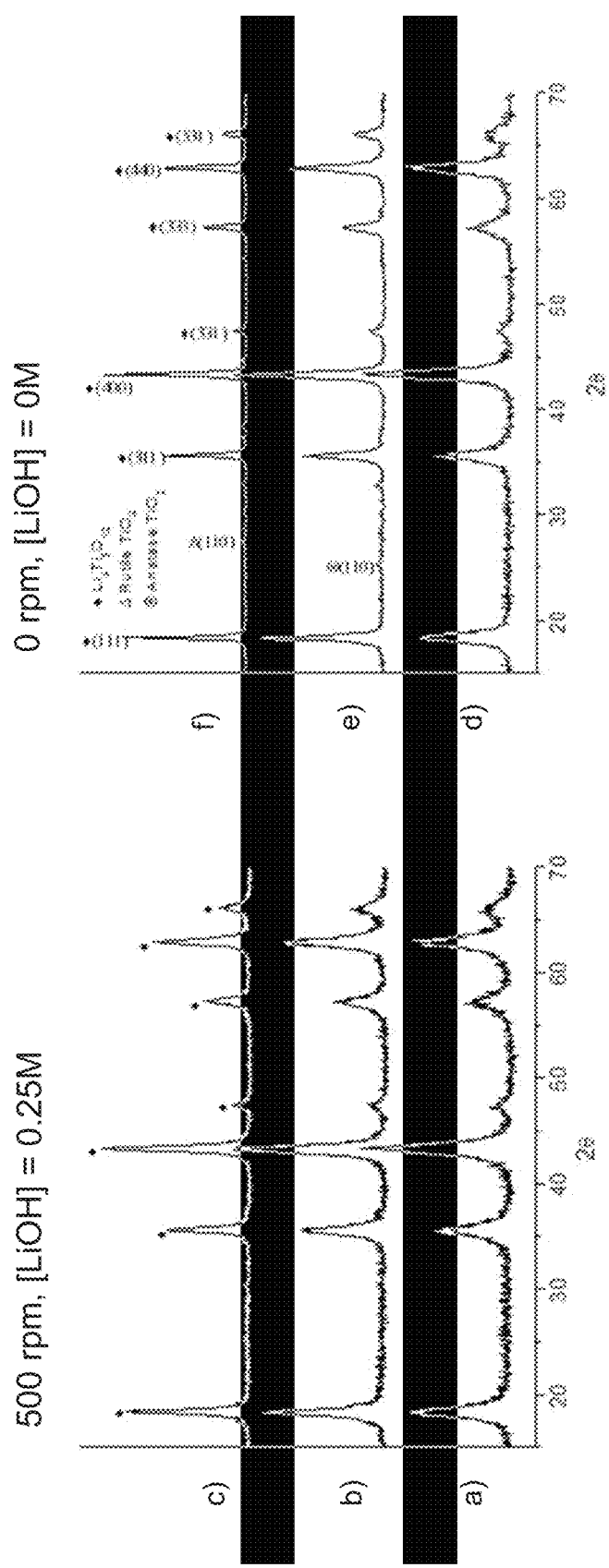
FIG. 22 shows the XRD diffractograms of the corresponding LTO materials shown in FIG. 21.

FIG. 22 compares XRD analysis of the LTO product from this example (FIG. 22a-c) with the product of Example 4 (a-c) (FIG. 22d-f). These demonstrate that the purity of the left hand LTOs is over 98% while the diffractograms on the right depict traces of TiO$_2$ in the product obtained through an aging process not involving agitation and LiOH.

Table 4 below further illustrates the physical characteristics of LTOs obtained by annealing at 400° C., 500° C. and 600° C. of an LTH obtained through an aging process involving LiOH (0.25M) and agitation, or an LTH obtained through an aging process involving neither LiOH nor agitation. These results show that a small grain size and high surface area especially for the LTO materials obtained through the annealing of the LTH obtained via an aging process involving agitation and addition of LiOH.

TABLE 4

Physical characteristics of LTO products

| [LiOH] (M) | Agitation (rpm) | Annealing Temp (° C.) | Grain Size (nm) | Specific area ($m^2/g$) |
|---|---|---|---|---|
| 0.25 | 500 | 400 | 7.2 | 86.4 |
|  |  | 500 | 10.8 | 90.6 |
|  |  | 600 | 15.1 | 66.5 |
| 0 | 0 | 400 | 9.4 | 102 |
|  |  | 500 | 16.4 | 53.7 |
|  |  | 600 | 31.8 | 28.0 |

The LTO product of the second line of Table 4 was also characterized using the Rietveld Refinement XRD method that confirmed the spinel $Li_4Ti_5O_{12}$ structure at 98.7% (by weight) purity. The rest was Ti—O compounds, e.g. $TiO_2$. The electrochemically inactive $\beta$-$Li_2TiO_3$ could not be detected.

Example 10

Figure 23:
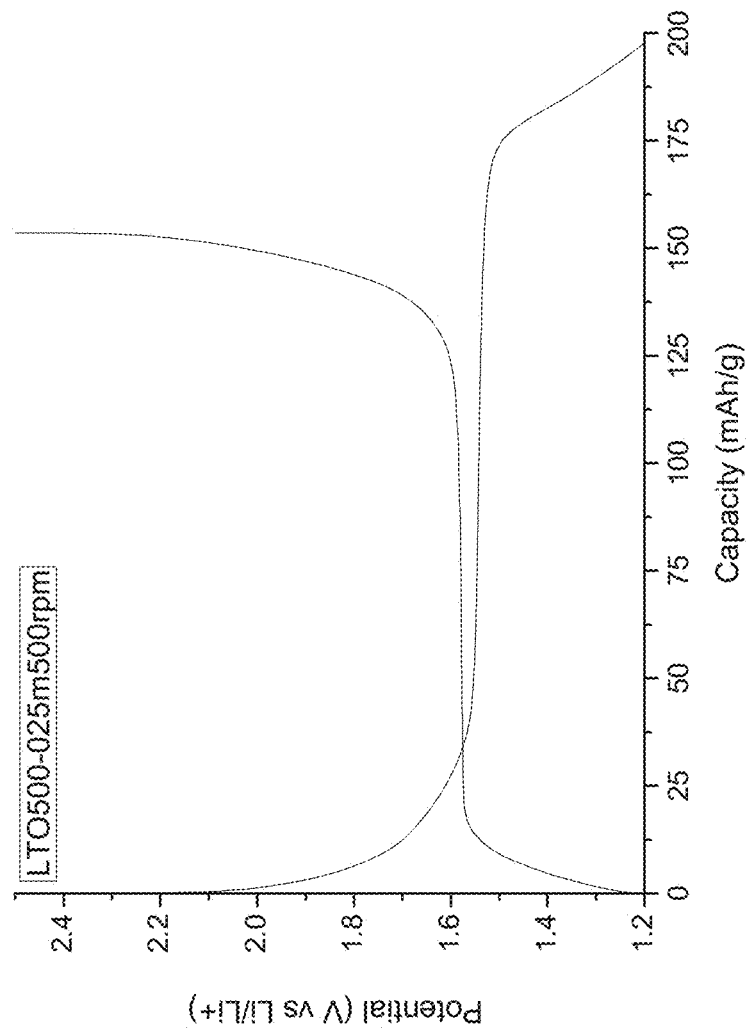
FIG. 23 shows galvanostatic charge/discharge voltage profiles of lithium coin cells comprising LTOs of the invention prepared according to Example 9, at C/24 in the potential range from 2.5 V to 1.2 V vs. $Li/Li^+$.

The LTO materials prepared in Example 9 (annealed at 500° C.—FIG. 21(b) and FIG. 22(b)) were used in the preparation of coin cells according to Example 8(a), and the cells thus obtained were tested for their electrochemical response in terms of initial charge/discharge capacities. The obtained results are shown in FIG. 23 and Table 5. The LTO nanosheet material of Example 9 (annealed at 500° C.—FIGS. 21(b) and 22(b)) yielded a first discharge capacity equal to 198 mAh/g for 1.2 V cutoff at a C/24 rate that was the same with the equivalent value for the Ex. 4(a)-400° C. material (199.6) but higher than that for Ex. 4(c)-600° C. material (176.9). At the same time the voltage profile (FIG. 23) is less curved than that of Ex. 4(a)-400° C. approaching that of Ex. 4(c)-600° C. implying that overall has the features to deliver stable cycling at high rate performance.

TABLE 5

Initial charge/discharge capacity in C/24 formation cycle

| LTO | Cut-off voltage vs. $Li/Li^+$ (V) | Capacity (mAh/g) Charge | Discharge | Efficiency (%) |
|---|---|---|---|---|
| Ex. 9 (500° C.) | 1.2 | 152 | 198 | 76.9 |

Numerous modifications could be made to any of the embodiments described above without departing from the scope of the present invention. Any references, patents or scientific literature documents referred to in this application are incorporated herein by reference in their entirety for all purposes.

REFERENCES

1. K. Zaghib, M. Gauthier, F. Brochu, A. Guerfi, M. Masse. M. Armand, "$Li_4Ti_5O_{12}$, $Li_{(4-alpha)}Z_{alpha}Ti_5O_{12}$ or $Li_4Z_{beta}Ti_{(5-beta)}O_{12}$ particles processes for obtaining same and use as electrocheical generators" U.S. patent, No. 20080285211, 2008
2. Khomane, R. B., A. S. Prakash, et al. (2011). "CTAB-assisted sol-gel synthesis of Li4Ti5O12 and its performance as anode material for Li-ion batteries." *Materials Research Bulletin* 46(7): 1139-1142.
3. L. Wang, X. He, J. Ren, J. Gao, J. Li, W. Pu, "Method for making luthium-ion battery electrode material" U.S. patent, U.S. patent 20110195177, 2011.
4. J. K. Kim, C. H. Woo, E. S. Choi, J. S. Lim, D. H. Kim, S. H. Ahn, "High-capacity anode material for lithium secondary batteries and process for synthesizing the same," U.S. patent, No. 20110135564, 2011.
5. J. T. Vaughey, M. M. Thackeray, A. J. Kahaian, A. N. Jansen, C. Chen, "Lithium-titanium-oxide anodes for lithium batteries", U.S. Pat. No. 6,221,531, 2001.
6. Sugita, M. (1990). "Synthetic inorganic ion-exchange materials. LVIII, Hydrothermal synthesis of a new layered lithium titanate and its alkali ion exchange." *Bulletin of the Chemical Society of Japan* 63(7): 1978.
7. Tang, Y., L. Yang, et al. (2009). "Li4Ti5O12 hollow microspheres assembled by nanosheets as an anode material for high-rate lithium ion batteries." *Electrochimica Acta* 54(26): 6244-6249.
8. Chen, J., L. Yang, et al. (2010). "Synthesis of sawtooth-like Li4Ti5O12 nanosheets as anode materials for Li-ion batteries." *Electrochimica Acta* 55(22): 6596-6600.
9. Hao, Y., Q. Lai, et al. (2005). "Synthesis by TEA sol-gel method and electrochemical properties of Li4Ti5O12 anode material for lithium-ion battery." *Solid State Ionics* 176(13-14): 1201-1206.
10. Matsui, E., Y. Abe, et al. (2008). "Solid-State Synthesis of 70 nm Li4Ti5O12 Particles by Mechanically Activating Intermediates with Amino Acids." *Journal of the American Ceramic Society* 91(5): 1522-1527.
11. Nugroho, A., S. J. Kim, et al. (2011). "Facile synthesis of nanosized Li4Ti5O12 in supercritical water." *Electrochemistry Communications* 13(6): 650-653.
12. M. Holzapfel, A. laumann, G. Nuspl, K. Fehr, F. Kiefer, "Process for the preparation of lithium titanium spinel and its use", U.S. patent, No. 20110189545, 2011.

The invention claimed is:

1. A process for producing lithium titanate (LTO) comprising the steps of:
    (a) providing a lithium titanate hydrate (LTH) intermediate of Formula I: $(Li_{2-x}H_x)Ti_2O_5 \cdot nH_2O$, wherein $0 \leq x \leq 0.5$, and wherein $0 < n < 4$; and
    (b) thermally treating said LTH intermediate of formula I to produce said LTO.

2. The process according to claim 1, wherein said LTH in step (a) is obtained by mixing a titanium-containing compound with a lithium-containing compound in an aqueous solvent to produce a lithium-titanium precursor mixture.

3. The process of claim 2, wherein the step of mixing is done at a temperature below 20° C.

4. The process of claim 3, wherein the step of mixing is done at a temperature below 10° C.

5. The process of claim 2, wherein the step of mixing is done at a pH higher than 10 and Li/Ti molar ratio 6.

6. The process of claim 2, wherein said titanium-containing compound comprises a titanium tetraalkoxide or titanium tetrachloride.

7. The process of claim 6, wherein said titanium-containing compound comprises titanium tetraisopropoxide, titanium tetrabutoxide, or a combination thereof.

8. The process according to claim 6, wherein said titanium-containing compound comprises titanium tetrachloride.

9. The process of claim 2, wherein said lithium-containing compound comprises LiOH, LiNO$_3$, LiCl, Li$_2$CO$_3$, Li$_2$O, LiHCO$_3$, Li$_2$SO$_4$, lithium acetate, or a combination thereof.

10. The process according to claim 9, wherein said lithium-containing compound comprises lithium hydroxide.

11. The process according to claim 2, wherein said aqueous solvent comprises a mixture of an organic solvent and water.

12. The process of claim 11, wherein said organic solvent comprises a ketone, an alcohol or a combination thereof.

13. The process of claim 12, wherein said organic solvent comprises acetone or ethanol, or a combination thereof.

14. The process according to claim 2, wherein said aqueous solvent is water or an alkaline aqueous solution.

15. The process of claim 1, further comprising isolating a precipitate and subjecting said precipitate to aging at a temperature below 100° C. to produce the LTH intermediate.

16. The process of claim 15, wherein said step of isolating a precipitate comprises centrifugation.

17. The process of claim 15, wherein said aging of the precipitate is carried out at a temperature of between 50° C. and 100° C.

18. The process of claim 17, wherein said temperature is about 80° C.

19. The process of claim 15, wherein said aging of the precipitate is carried out for up to 36 hours.

20. The process of claim 15, wherein said aging of the precipitate is carried out without stirring.

21. The process of claim 15, wherein said aging of the precipitate is carried out with stirring.

22. The process of claim 15, wherein said aging further comprises adding the precipitate in an aqueous lithium hydroxide solution.

23. The process of claim 22, further comprising a step of isolating the LTH intermediate produced.

24. The process of claim 22, wherein said aging of the precipitate is done in a lithium hydroxide solution with a concentration of 0.1 to 0.6M.

25. The process of claim 1, wherein said step of providing a LTH intermediate of formula I further comprises a step of drying the LTH intermediate obtained.

26. The process according to claim 1, wherein said LTH intermediate in step (a) is (Li$_{1.81}$H$_{0.19}$)Ti$_2$O$_5$·2H$_2$O.

27. The process according to claim 2, wherein the step of mixing further comprises adding a dopant-containing compound.

28. The process of claim 27, wherein said dopant-containing compound comprises one or more of acetates, nitrates, chlorides, fluorides, and bromides of one or more metal elements Al, Mg, Ga, Fe, Co, Se, Y, Mn, Ni, Cr, or V.

29. The process according to claim 1, wherein said step (b) of thermally treating said LTH intermediate comprises heating the LTH intermediate at a temperature within a range of from 350° C. to 700° C.

30. The process of claim 29, wherein said temperature is within a range of from 400° C. to 600° C.

31. The process of claim 1, wherein said step of thermally treating the LTH intermediate is done for a period of time between 1 hour and 12 hours.

32. The process of claim 1, further comprising a step of grinding the LTO obtained.

33. A lithium titanate (LTO) obtained according to the process as defined in claim 1.

34. The LTO according to claim 33, wherein said LTO is Li$_4$Ti$_5$O$_{12}$.

35. The LTO of claim 34, wherein said LTO is spinel Li$_4$Ti$_5$O$_{12}$.

36. The LTO of claim 33, wherein said LTO has a purity equal to or above 98%.

37. The LTO according to claim 32, wherein the LTO is nanostructured with nanoparticles or nanosheets size below 100 nm.

38. The LTO according to claim 33, wherein said LTO comprises a nanoparticle structure.

39. The LTO according to claim 33, wherein said LTO comprises a nanosheet structure.

40. A lithium battery, said lithium battery comprising lithium titanate obtained according to the process as defined in claim 1.

41. An electrode comprising a LTO obtained by a process according to claim 1.

42. The electrode of claim 41, wherein said electrode in an anode.

43. A battery comprising an anode, an electrolyte and a cathode, wherein said anode is an electrode of claim 42.

44. The process according to claim 1, wherein $0.1 \leq x \leq 0.3$.

45. The process of claim 1, wherein $0.15 \leq x \leq 0.25$.

46. The process of claim 1; wherein $1 \leq n \leq 3$.

47. The process of claim 24, wherein said lithium hydroxide solution has a concentration of 0.2 to 0.4 M.

48. The process of claim 24, wherein said lithium hydroxide solution has a concentration of 0.25 to 0.3 M.

* * * * *